US012756431B2

(12) United States Patent
Gong et al.

(10) Patent No.: US 12,756,431 B2
(45) Date of Patent: Oct. 6, 2026

(54) CYCLIC SHIFT DIVERSITY-BASED COMMUNICATION METHOD, APPARATUS, AND SYSTEM

(71) Applicant: HUAWEI TECHNOLOGIES CO., LTD., Shenzhen (CN)

(72) Inventors: Bo Gong, Shenzhen (CN); Chenchen Liu, Shenzhen (CN); Ming Gan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 281 days.

(21) Appl. No.: 18/456,335

(22) Filed: Aug. 25, 2023

(65) Prior Publication Data

US 2023/0412216 A1 Dec. 21, 2023

Related U.S. Application Data

(63) Continuation of application No. PCT/CN2022/077403, filed on Feb. 23, 2022.

(30) Foreign Application Priority Data

Feb. 25, 2021 (CN) ........................ 202110215096.3

(51) Int. Cl.
*H04B 7/0413* (2017.01)
*H04L 27/26* (2006.01)

(52) U.S. Cl.
CPC ....... *H04B 7/0413* (2013.01); *H04L 27/2607* (2013.01)

(58) Field of Classification Search
CPC .................................................... H04B 7/0413
See application file for complete search history.

(56) References Cited

U.S. PATENT DOCUMENTS

2016/0099764 A1* 4/2016 Yang .................... H04B 7/0671 370/329
2016/0255645 A1 9/2016 Li et al.

(Continued)

FOREIGN PATENT DOCUMENTS

WO 2020085650 A1 4/2020
WO 2020207460 A1 10/2020

OTHER PUBLICATIONS

IEEE Std 802.11n™-2009, "IEEE Standard for Information technology—Telecommunications and information exchange between systems; Local and metropolitan area networks-Specific requirements; Part 11: Wireless LAN Medium Access Control (MAC) and Physical Layer (PHY) specifications; Amendment 5: Enhancements for Higher Throughput," Oct. 29, 2009, 536 pages.

(Continued)

*Primary Examiner* — Jason E Mattis
(74) *Attorney, Agent, or Firm* — Fish & Richardson P.C.

(57) ABSTRACT

This application relates to communication methods, apparatuses, systems and computer-readable storage mediums. In an example method, a first communication apparatus generates a physical layer protocol data unit (PPDU), where the PPDU includes a short training field (STF), a long training field (LTF), and a data field. Cyclic shift is performed on at least one of the STF, the LTF, or the data field based on a cyclic shift diversity (CSD). The CSD includes L elements, and L is a maximum number of spatial streams supported by the first communication apparatus. The maximum number of spatial streams supported by the first communication apparatus is greater than 8. The example method further includes the first communication apparatus sending the PPDU to a second communication apparatus.

18 Claims, 6 Drawing Sheets

(56) References Cited

U.S. PATENT DOCUMENTS

| | | | | |
|---|---|---|---|---|
| 2021/0320754 | A1* | 10/2021 | Yun | H04L 27/261 |
| 2022/0029687 | A1* | 1/2022 | Xia | H04B 7/0684 |
| 2023/0336389 | A1* | 10/2023 | Gong | H04L 69/06 |
| 2024/0056157 | A1 | 2/2024 | Xia et al. | |

OTHER PUBLICATIONS

IEEE Std 802.11ac™-2013, "IEEE Standard for Information technology—Telecommunications and information exchange between systems; Local and metropolitan area networks-Specific requirements; Part 11: Wireless LAN Medium Access Control (MAC) and Physical Layer (PHY) Specifications; Amendment 4: Enhancements for Very High Throughput for Operation in Bands below 6 GHz," Dec. 11, 2013, 425 pages.

IEEE P802.11ax™/D8.0, "Draft Standard for Information technology—Telecommunications and information exchange between systems Local and metropolitan area networks-Specific requirements; Part 11: Wireless LAN Medium Access Control (MAC) and Physical Layer (PHY) Specifications, Amendment 1: Enhancements for High Efficiency WLAN," Oct. 2020, 820 pages.

IEEE Std 802.11™-2016, "IEEE Standard for Information technology—Telecommunications and information exchange between systems Local and metropolitan area networks-Specific requirements, Part 11: Wireless LAN Medium Access Control (MAC) and Physical Layer (PHY) Specifications," Dec. 7, 2016, 3534 pages.

IEEE P802.11be™/D0.01, "Draft Standard for Information technology—Telecommunications and information exchange between systems Local and metropolitan area networks-Specific requirements; Part 11: Wireless LAN Medium Access Control (MAC) and Physical Layer (PHY) Specifications; Amendment 7: Enhancements for extremely high throughput (EHT)," Jul. 2020, 33 pages.

Extended European Search Report in European Appln No. 22758879.5, dated Jun. 21, 2024, 8 pages.

Office Action in Korean Appln. No. 2023-7030649, mailed on Jul. 22, 2026, 14 pages (with English translation).

* cited by examiner

CYCLIC SHIFT DIVERSITY-BASED COMMUNICATION METHOD, APPARATUS, AND SYSTEM

CROSS-REFERENCE TO RELATED APPLICATIONS

This application is a continuation of International Patent Application No. PCT/CN2022/077403, filed on Feb. 23, 2022, which claims priority to Chinese Patent Application No. 202110215096.3, filed on Feb. 25, 2021. The disclosures of the aforementioned applications are hereby incorporated by reference in their entireties.

TECHNICAL FIELD

This application relates to the field of communication technologies, and in particular, to a cyclic shift diversity-based communication method, an apparatus, and a system.

BACKGROUND

To greatly improve a service transmission rate of a wireless local access network (WLAN) system, the institute of electrical and electronics engineers (IEEE) has introduced a multi-input multi-output (MIMO) technology on the basis of an OFDM technology. In a WLAN-MIMO system, a physical layer protocol data unit (PPDU) is mapped to a plurality of spatial streams for sending. On each spatial stream, a short training field (STF) transmits a same sequence, and a data field transmits different service data. For an 802.11n device, a receive end sets an automatic gain control (AGC) gain based on power of a high throughput short training field (HT-STF), and uses the gain to adjust power of a data field. For an 802.11ac device, a receive end sets an AGC gain based on power of a very high throughput short training field (VHT-STF), and uses the gain to adjust power of a data field. For an 802.11ax device, a receive end sets an AGC gain based on power of a high efficient-short training field (HE-STF), and uses the gain to adjust power of a data field.

However, because STFs transmit a same sequence on spatial streams, from a perspective of the receive end, an STF sequence easily generates unnecessary beamforming (BF) effect after passing through a channel. To be specific, the STFs are superimposed on different spatial streams when phases are similar, and the STFs are cancelled when the phases are reverse. Overall, receive power of the STF changes in a large range, while receive power of a data part is stable. In other words, a ratio of the power of the STF to the power of the data field changes in a large range, and there is a large AGC gain setting error.

SUMMARY

This application provides a cyclic shift diversity-based communication method, an apparatus, and a system, to improve a system capacity and spectral efficiency, and reduce an automatic gain control (AGC) gain setting error.

According to a first aspect, this application provides a cyclic shift diversity-based communication method. The method may be performed by a first communication apparatus, or may be performed by a component of the first communication apparatus, for example, a processor, a chip, or a chip system of the first communication apparatus. In this application, an example in which the first communication apparatus performs the method is used for description. The method includes: The first communication apparatus generates a physical layer protocol data unit PPDU, where the PPDU includes a short training field STF, a long training field LTF, and a data field; cyclic shift is performed on at least one of the STF, the LTF, and the data field based on a cyclic shift diversity CSD; the CSD includes L elements, and L is a maximum number of spatial streams supported by the first communication apparatus; and the maximum number of spatial streams is greater than 8. The first communication apparatus sends the PPDU to a second communication apparatus.

According to the foregoing technical solution, compared with a maximum of eight spatial streams, the maximum number of spatial streams may be expanded to greater than the maximum of eight streams, for example, the maximum number of spatial streams may be expanded to 16. Therefore, this solution is applicable to a communication scenario with a high communication requirement and a large amount of data. This improves a system capacity and spectral efficiency. In addition, based on a maximum number of expanded spatial streams in this application, a corresponding CSD is further used to perform cyclic shift on at least one of the STF, the LTF, and the data field in this application, to reduce a correlation between STFs on the spatial streams, and correspondingly reduce an AGC gain setting error when AGC is performed based on power of the STF.

In some possible designs, that the first communication apparatus sends the PPDU to a second communication apparatus includes: The first communication apparatus sends the PPDU to the second communication apparatus over K spatial streams, where K is a positive integer less than or equal to L.

In other words, the first communication apparatus may send the PPDU over less than L spatial streams. In an actual application, due to complex and diversified channel environments, a larger number of spatial streams do not indicate higher spectral efficiency or transmission performance. Therefore, based on this possible implementation, when sending the PPDU, the first communication apparatus may determine, based on an actual channel condition, to send the PPDU over less than L spatial streams, so as to maximize the spectral efficiency as much as possible. When a channel condition is good, K may be equal to L, to be specific, the first communication apparatus sends the PPDU over the L spatial streams, to maximize the spectral efficiency.

In some possible designs, the STF, the LTF, and the data field are processed based on the first K elements in the CSD. It should be understood that the first K elements in the CSD are cyclic shift values respectively corresponding to K spatial streams. Based on the possible design, when the PPDU is sent over the K spatial streams, the STF, the LTF, and the data field are processed by using the first K elements in the CSD, to perform cyclic shift on the K spatial streams, and correspondingly reduce a correlation between STFs on the spatial streams.

In some possible designs, L is equal to 16, and the CSD includes: 0, −400, −200, −600, −350, −650, −100, −750, −250, −475, −125, −450, −75, −175, −725, and −625.

Based on this possible design, the CSD provided in this application can be compatible with the 802.11n protocol, the 802.11ac protocol, or the 802.11ax protocol. This facilitates smooth evolution of a system. In addition, when the CSD is compatible with the 802.11n protocol and a data packet of the 802.11n protocol needs to be sent, or when the CSD is compatible with the 802.11ac/802.11ax protocol and a data packet of the 802.11ac/802.11ax protocol needs to be sent, cyclic shift may be directly performed based on the CSD provided in this application. This can reduce implementation complexity, compared with cyclic shift separately performed on data packets of corresponding standards based on a plurality of standard CSDs.

In some possible designs, L is equal to 16, and the CSD includes: 0, −425, −200, −650, −475, −300, −625, −225, −150, −525, −50, −25, −375, −400, −550, and −325.

Based on the possible design, a criterion value is determined based on a change range of a ratio of the power of the STF to power of a corresponding data field, and the CSD is determined based on a smallest criterion value in a plurality of criterion values. A smaller change range of the ratio of the power of the STF to the power of the data field indicates more accurate AGC setting. Therefore, the CSD provided in this application can reduce the AGC gain setting error.

According to a second aspect, this application provides a cyclic shift diversity-based communication method. The method may be performed by a second communication apparatus, or may be performed by a component of the second communication apparatus, for example, a processor, a chip, or a chip system of the second communication apparatus. In this application, an example in which the second communication apparatus performs the method is used for description. The method includes: The second communication apparatus receives a physical layer protocol data unit PPDU from a first communication apparatus, where the PPDU includes a short training field STF, a long training field LTF, and a data field; at least one of the STF, the LTF, and the data field is obtained after cyclic shift is performed based on a cyclic shift diversity CSD; the CSD includes L elements, and L is a maximum number of spatial streams supported by the first communication apparatus; and the maximum number of spatial streams is greater than 8. The second communication apparatus performs processing based on the PPDU.

In some possible designs, the STF, the LTF, and the data field are obtained through processing based on the first K elements in the CSD.

In some possible designs, L is equal to 16, and the CSD includes: 0, −400, −200, −600, −350, −650, −100, −750, −250, −475, −125, −450, −75, −175, −725, and −625.

In some possible designs, L is equal to 16, and the CSD includes: 0, −425, −200, −650, −475, −300, −625, −225, −150, −525, −50, −25, −375, −400, −550, and −325.

For the technical effects brought by any possible design of the second aspect, refer to the technical effects brought by corresponding designs of the first aspect. Details are not described herein again.

According to a third aspect, this application provides a communication apparatus, configured to implement the foregoing methods. The communication apparatus may be the first communication apparatus in the first aspect, an apparatus including the first communication apparatus, or an apparatus included in the first communication apparatus, for example, a chip. Alternatively, the communication apparatus may be the second communication apparatus in the second aspect, an apparatus including the second communication apparatus, or an apparatus included in the second communication apparatus, for example, a chip. The communication apparatus includes a corresponding module, unit, or means for implementing the foregoing method. The module, unit, or means may be implemented by hardware, software, or hardware executing corresponding software. The hardware or the software includes one or more modules or units corresponding to the foregoing functions.

In some possible designs, the communication apparatus may include a processing module and a transceiver module. The transceiver module may also be referred to as a transceiver unit, and is configured to implement a sending function and/or a receiving function according to any one of the foregoing aspects or the possible implementations of the foregoing aspects. The transceiver module may include a transceiver circuit, a transceiver machine, a transceiver, or a communication interface. The processing module may be configured to implement a processing function according to any one of the foregoing aspects or the possible implementations of the foregoing aspects.

In some possible implementations, the transceiver module includes a sending module and a receiving module, respectively configured to implement the sending function and the receiving function according to any one of the foregoing aspects or the possible implementations of the foregoing aspects.

The communication apparatus provided in the third aspect is configured to perform any one of the first aspect or the possible implementations of the first aspect. For specific details, refer to any one of the first aspect or the possible implementations of the first aspect. Details are not described herein again.

According to a fourth aspect, this application provides a communication apparatus. The apparatus includes a processor and a memory. The memory is configured to store computer instructions. When the processor executes the instructions, the communication apparatus is enabled to perform the method according to any one of the foregoing aspects. The communication apparatus may be the first communication apparatus in the first aspect, an apparatus including the first communication apparatus, or an apparatus included in the first communication apparatus, for example, a chip. Alternatively, the communication apparatus may be the second communication apparatus in the second aspect, an apparatus including the second communication apparatus, or an apparatus included in the second communication apparatus, for example, a chip.

According to a fifth aspect, this application provides a communication apparatus, including a processor and a communication interface. The communication interface is configured to communicate with a module other than the communication apparatus. The processor is configured to execute a computer program or instructions, so that the communication apparatus performs the method according to any one of the foregoing aspects. The communication apparatus may be the first communication apparatus in the first aspect, an apparatus including the first communication apparatus, or an apparatus included in the first communication apparatus, for example, a chip. Alternatively, the communication apparatus may be the second communication apparatus in the second aspect, an apparatus including the second communication apparatus, or an apparatus included in the second communication apparatus, for example, a chip.

According to a sixth aspect, this application provides a communication apparatus, including an interface circuit and a logic circuit. The interface circuit is configured to obtain input information and/or output information. The logic circuit is configured to perform the method according to any one of the foregoing aspects or the possible implementations of the foregoing aspects, perform processing based on the input information, and/or generate the output information.

According to a seventh aspect, this application provides a communication apparatus, including at least one processor. The processor is configured to execute a computer program or instructions stored in a memory, so that the communication apparatus performs the method according to any one of the foregoing aspects. The memory may be coupled to the processor, or may be independent of the processor. The communication apparatus may be the first communication apparatus in the first aspect, an apparatus including the first communication apparatus, or an apparatus included in the first communication apparatus, for example, a chip. Alternatively, the communication apparatus may be the second communication apparatus in the second aspect, an apparatus including the second communication apparatus, or an apparatus included in the second communication apparatus, for example, a chip.

In some possible designs, the apparatus is a chip or a chip system. When the apparatus is the chip system, the apparatus may include a chip, or may include the chip and another discrete component.

According to an eighth aspect, this application provides a computer-readable storage medium. The computer-readable storage medium stores instructions. When the instructions are run on a communication apparatus, the communication apparatus is enabled to perform the method according to any one of the foregoing aspects.

According to a ninth aspect, this application provides a computer program product including instructions. When the computer program product runs on a communication apparatus, the communication apparatus is enabled to perform the method according to any one of the foregoing aspects.

It may be understood that, when the communication apparatus provided in any one of the third aspect to the ninth aspect is a chip, the foregoing sending action/function may be understood as outputting data or information, and the foregoing receiving action/function may be understood as inputting data or information.

According to a tenth aspect, this application provides a communication apparatus. The communication apparatus is configured to perform the method according to any one of the foregoing aspects.

For the technical effects brought by any one of the designs of the third aspect to the tenth aspect, refer to the technical effects brought by different designs of the first aspect or the second aspect. Details are not described herein again.

According to an eleventh aspect, this application provides a communication system. The communication system includes the first communication apparatus and the second communication apparatus according to the foregoing aspects.

Figure 6:
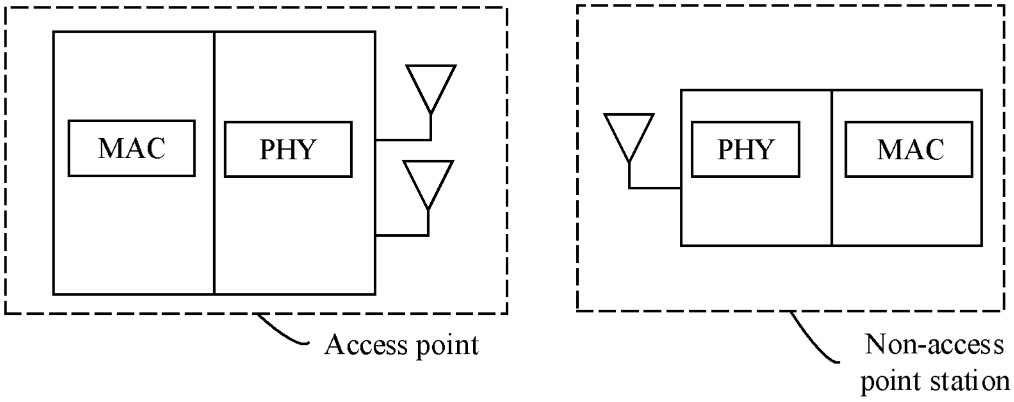
Figure 7:
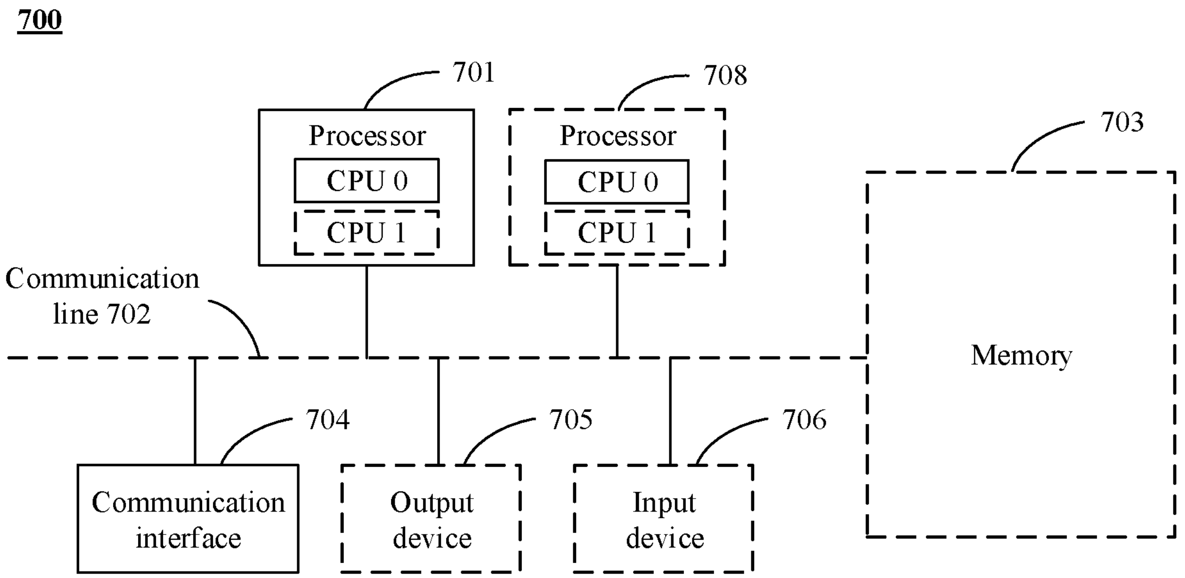
Figure 8:
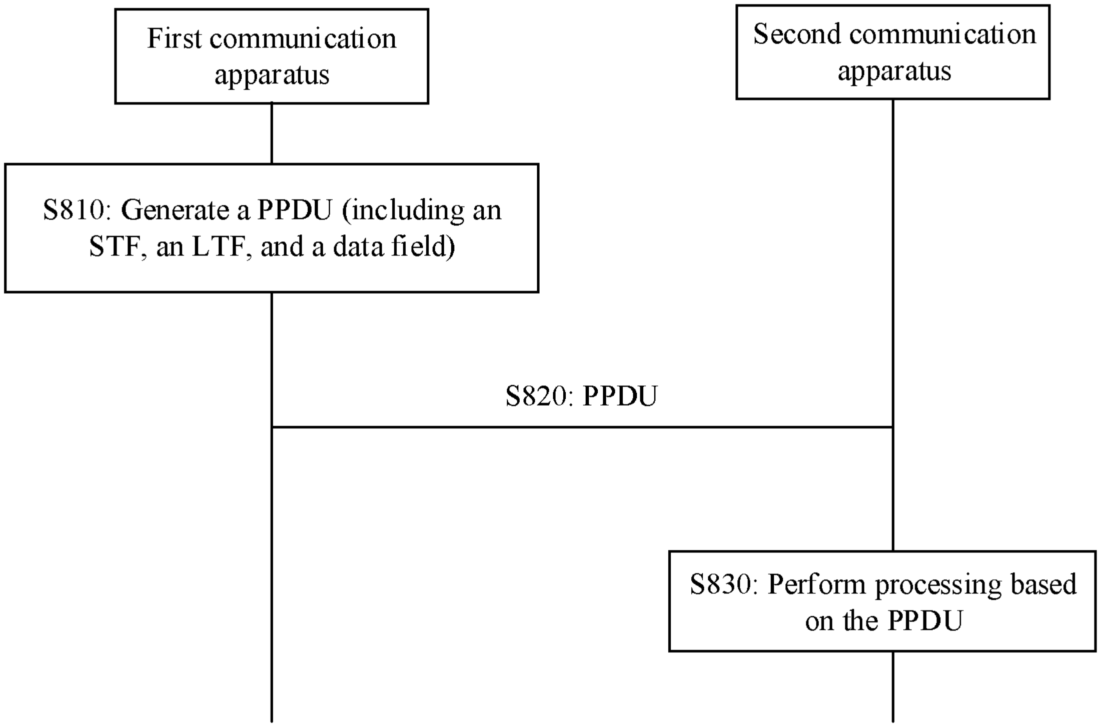
Figure 9:
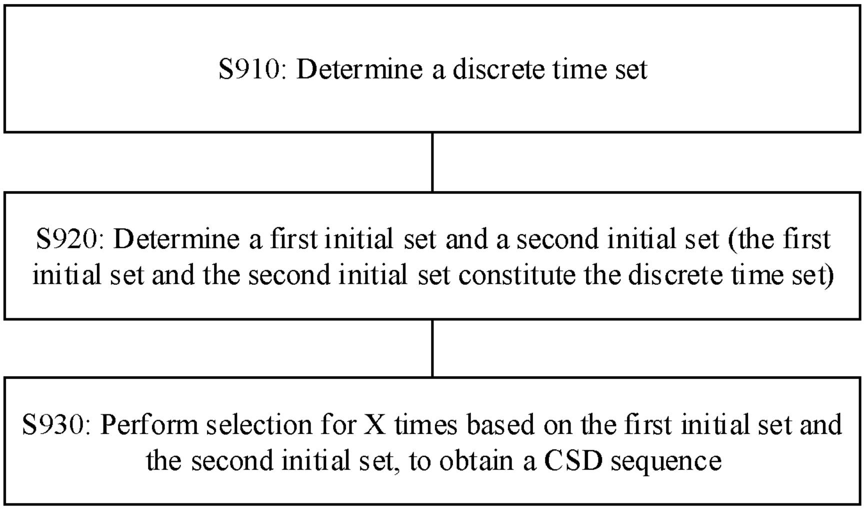
Figure 10:
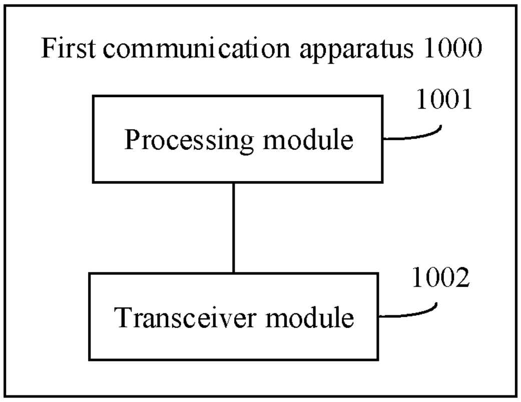
Figure 11:
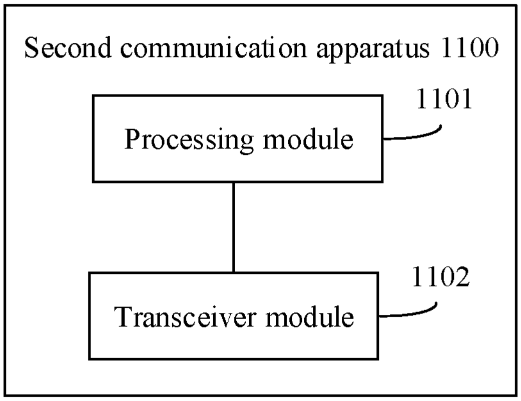

FIG. **5*a*** is a schematic diagram of an architecture of a communication system according to an embodiment of this application;

FIG. **5*b*** is a schematic diagram of another architecture of a communication system according to an embodiment of this application;

FIG. 6 is a schematic diagram of structures of an access point and a non-access point station according to an embodiment of this application;

FIG. 7 is a schematic diagram of a structure of a communication apparatus according to an embodiment of this application;

FIG. 8 is a schematic flowchart of a CSD-based communication method according to an embodiment of this application;

FIG. 9 is a schematic flowchart of determining a CSD according to an embodiment of this application;

FIG. 10 is a schematic diagram of a structure of a first communication apparatus according to an embodiment of this application; and FIG. 11 is a schematic diagram of a structure of a second communication apparatus according to an embodiment of this application.

DESCRIPTION OF EMBODIMENTS

Unless otherwise specified, "/" in the descriptions of embodiments of this application represents an "or" relationship between associated objects. For example, A/B may represent A or B. In this application, "and/or" describes only an association relationship for describing associated objects and represents that three relationships may exist. For example, A and/or B may represent the following three cases: Only A exists, both A and B exist, and only B exists. A and B may be singular or plural. In addition, in the descriptions of this application, "a plurality of" means two or more than two unless otherwise specified. "At least one of the following items (pieces)" or a similar expression thereof refers to any combination of these items, including any combination of singular items (pieces) or plural items (pieces). For example, at least one (piece) of a, b, or c may represent: a, b, c, a and b, a and c, b and c, or a, b, and c, where a, b, and c may be singular or plural. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

It should be noted that, in this application, words "example" or "for example" are used to represent giving an example, an illustration, or a description. Any embodiment or design scheme described as an "example" or "for example" in this application should not be explained as being more preferred or having more advantages than another embodiment or design scheme. Exactly, use of the word "example", "for example", or the like is intended to present a related concept in a specific manner.

Figure 1:
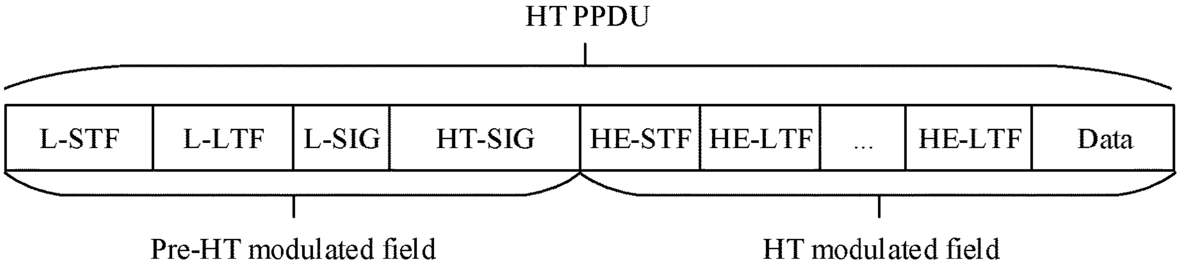
FIG. 1 is a schematic diagram 1 of a frame structure of a PPDU according to an embodiment of this application.

To facilitate understanding of the technical solutions in embodiments of this application, a related technology in this application is first briefly described as follows:

1. Frame Structure of a Physical Layer Protocol Data Unit (PPDU) in the 802.11n Standard FIG. 1 shows a frame structure of a high throughput (HT) PPDU in the 802.11n standard.

The HT PPDU includes two parts depending on a modulation mode. One part is set for compatibility with a legacy frame, and is referred to as a pre-HT modulated field. The part includes a legacy short training field (L-STF), a legacy long training field (L-LTF), a legacy signal field (L-SIG), and a high throughput signal field (HT-SIG). The other part is HT-modulated, and is referred to as an HT field. The part includes a high throughput short training field (HT-STF), a high throughput long training field (HT-LTF), and a data field.

2. Frame Structure of a PPDU in the 802.11ac Standard

Figure 2:
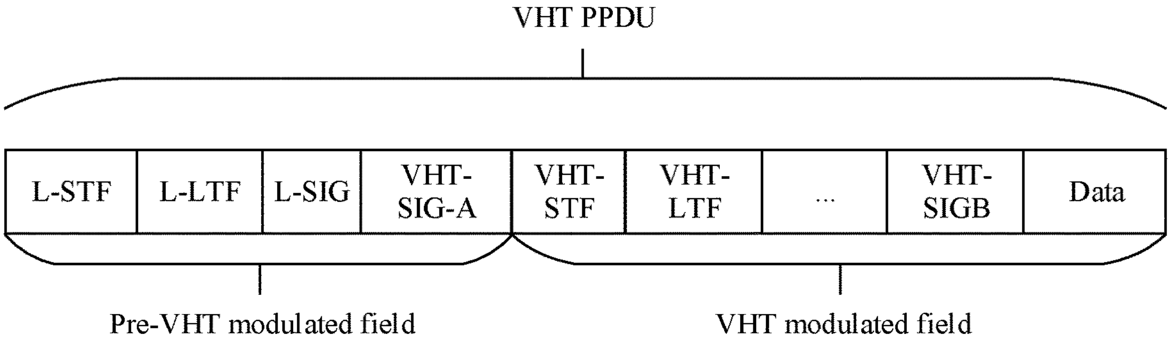
FIG. 2 is a schematic diagram 2 of a frame structure of a PPDU according to an embodiment of this application.

FIG. 2 shows a frame structure of a very high throughput (VHT) PPDU in the 802.11ac standard.

Similar to the HT PPDU in 802.11n, the VHT PPDU also includes two parts. One part is a pre-VHT field compatible with a legacy frame structure, and includes an L-STF, an L-LTF, an L-SIG, and a very high throughput signal field A (VHT-SIG-A). The other part is VHT-modulated, and is referred to as a VHT field. The part includes a very high throughput short training field (VHT-STF), a very high throughput long training field (VHT-LTF), a very high throughput signal field B (VHT-SIG-B), and a data field.

3. Frame Structure of a PPDU in the 802.11ax Standard

Figure 3:
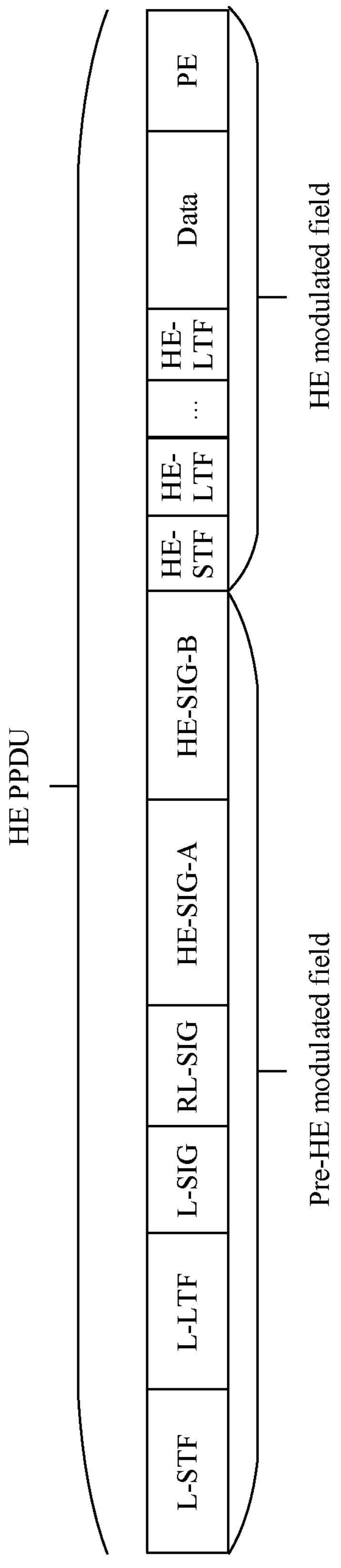
FIG. 3 is a schematic diagram 3 of a frame structure of a PPDU according to an embodiment of this application.

FIG. 3 shows a frame structure of a high efficiency (HE) PPDU in the 802.11ax standard.

Similar to the HT PPDU in 802.11n, the HE PPDU also includes two parts. One part is a pre-HE field, and includes an L-STF, an L-LTF, an L-SIG, a repeated legacy-signal field (RL-SIG), a high efficient-signal field A HE-SIG A), and a high efficient-signal field B (HE-SIG B). The other part is an HE modulated field, and includes a high efficient-short training field (HE-STF), a high efficient-long training field (HE-LTF), and a data field. Optionally, the PPDU may further include a packet extension (PE).

Figure 4:
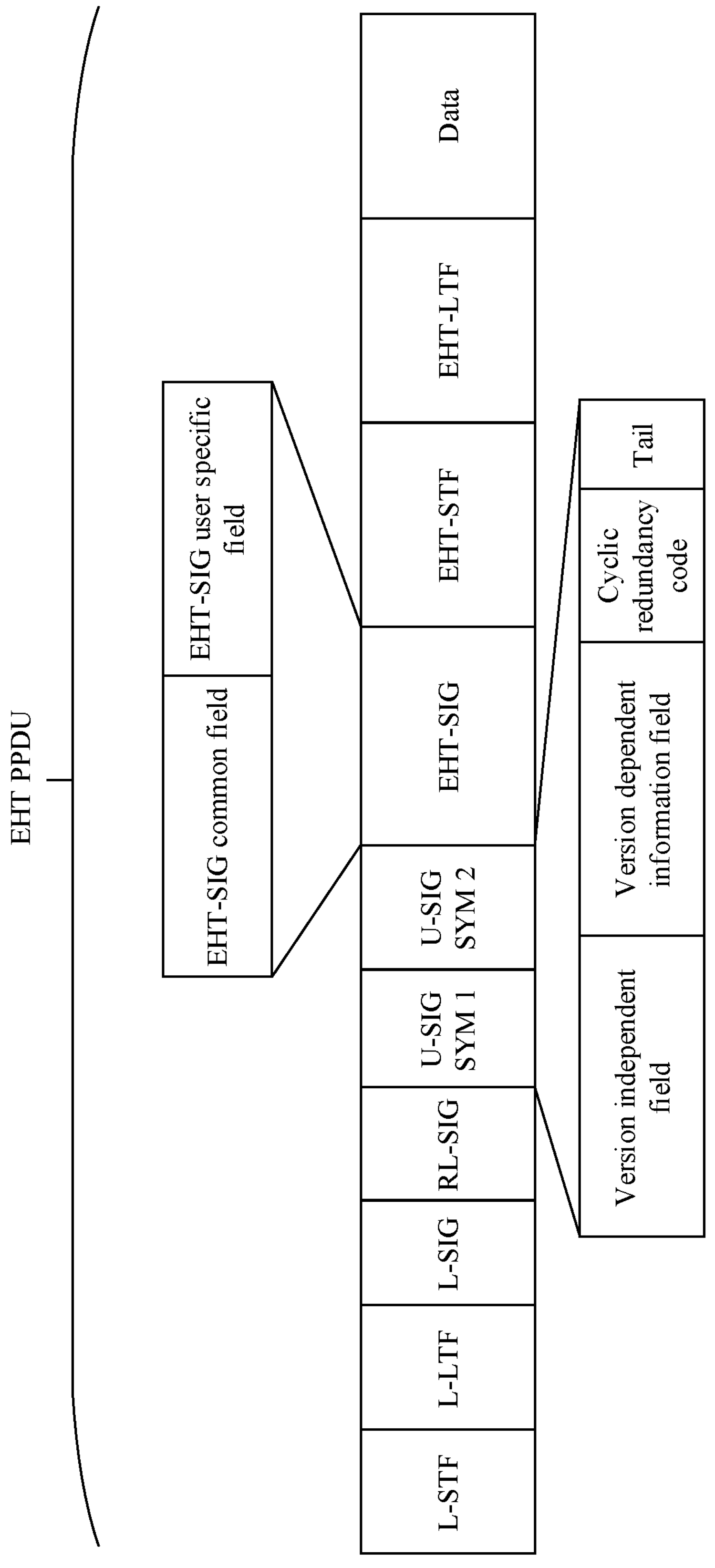
FIG. 4 is a schematic diagram 4 of a frame structure of a PPDU according to an embodiment of this application.

FIG. 4 shows a frame structure of an extremely high throughput (EHT) PPDU that may be used in 802.11be. The EHT PPDU may include three parts: a legacy preamble (L-preamble), an extremely high throughput preamble (EHT-preamble), and a data field.

The L-preamble part includes an L-STF field, an L-LTF field, and an L-SIG field. The EHT-preamble part includes an RL-SIG field, a universal (U-SIG) field, an extremely high throughput signal (EHT-SIG) field, an extremely high throughput short training field (EHT-STF), and an extremely high throughput long training field (EHT-LTF). The data field part includes a data field. The U-SIG field occupies two orthogonal frequency division multiplexing (OFDM) symbols such as a U-SIG SYM 1 and a U-SIG SYM 2 shown in FIG. 4. The universal (U-SIG) field may include a version independent information field, a version dependent information field, a cyclic redundancy code (CRC) field, and a tail field. The version independent information field may include a wireless fidelity (Wi-Fi) version field of 3 bits, a downlink/uplink field of 1 bit, a BSS color field of at least 6 bits, and a transmission opportunity (TXOP) field of at least 7 bits. Further, the version independent information field may further include a bandwidth field. The version dependent information field may include a PPDU format field and the like, and may further include one or more of a modulation and coding scheme field, a spatial stream field, an encoding field, and the like. The CRC field occupies at least 4 bits, and the tail field occupies at least 6 bits of a tail bit field.

In a possible implementation, the EHT-SIG field includes an EHT-SIG common field and an EHT-SIG user specific field. The EHT-SIG common field may be used to carry resource allocation information allocated to a station, and the EHT-SIG user specific field may be used to carry user information.

It should be understood that the EHT-PPDU is merely an example. In a standard formulation process or a technical development process, there may be another structure. This is not limited in this application.

In a WLAN-MIMO system, a PPDU may be mapped to a plurality of spatial streams for sending. On each spatial stream, an STF transmits a same sequence, and a data field transmits different service data. A receive end sets an automatic gain control (AGC) gain based on power of the STF, and uses the gain to adjust power of a data field on a corresponding spatial stream.

However, because STFs transmit a same sequence on spatial streams, from a perspective of the receive end, an STF sequence easily generates unnecessary beamforming (BF) effect after passing through a channel. To be specific, the STFs are superimposed on different spatial streams when phases are similar, and the STFs are cancelled when the phases are reverse. Overall, receive power of the STF changes in a large range, while receive power of a data part is stable. In other words, a ratio of the power of the STF to the power of the data field changes in a large range, and there is a large AGC gain setting error.

Based on this, when sending the PPDU, a transmit end may separately perform cyclic shift for a specific time on each spatial stream of a PPDU HT modulated field in the 802.11n standard, a PPDU VHT modulated field in the 802.11ac standard, or a PPDU HE modulated field in the 802.11ax standard. In this way, an inter-stream correlation between the HT-STFs, the VHT-STFs, or the HE-STFs is reduced, so that the HT-STF, the VHT-STF, or the HE-STF is more similar to a random data part. Therefore, a ratio of the power of the STF to power of the data part is more stable, and further the AGC gain setting error can be reduced. That is, the HT modulated field, the VHT modulated field, or the HE modulated field of the PPDU sent by the transmit end is obtained after cyclic shift is performed.

When the CSD is used to reduce the AGC gain setting error, a CSD value needs to be properly designed, so that a degree of correlation between the STFs on the spatial streams is small enough. Currently, CSD values of 1 to 4 streams are defined in the 802.11n standard, as shown in Table 1.

In Table 1, cells not filled with data indicate that there is no corresponding CSD value. When a number of spatial streams is 1, no cyclic shift is performed. When a number of spatial streams is 2, no cyclic shift is performed on a $1^{st}$ spatial stream, and a cyclic shift value corresponding to a $2^{nd}$ spatial stream is −400 ns. To be specific, a signal of the first 400 ns of each OFDM symbol in an original STF, LTF, and data is shifted to a tail of the symbol, and remaining content of the symbol is shifted forward by 400 ns. When a number of spatial streams is 3, no cyclic shift is performed on a $1^{st}$ spatial stream, a cyclic shift value corresponding to a $2^{nd}$ spatial stream is −400 ns, and a cyclic shift value corresponding to a $3^{rd}$ spatial stream is −200 ns. When a number of spatial streams is 4, no cyclic shift is performed on a $1^{st}$ spatial stream, a cyclic shift value corresponding to a $2^{nd}$ spatial stream is −400 ns, a cyclic shift value corresponding to a $3^{rd}$ spatial stream is −200 ns, and a cyclic shift value corresponding to a $4^{th}$ spatial stream is −600 ns.

TABLE 1

| Number of | CSD value of each spatial stream (unit: nanosecond, (ns)) | | | |
|---|---|---|---|---|
| spatial streams | $1^{st}$ stream | $2^{nd}$ stream | $3^{rd}$ stream | $4^{th}$ stream |
| 1 | 0 | — | — | — |
| 2 | 0 | −400 | — | — |
| 3 | 0 | −400 | −200 | — |
| 4 | 0 | −400 | −200 | −600 |

In addition, CSD values of 1 to 8 streams are defined in the 802.11ac standard, as shown in Table 2. For related descriptions, refer to related descriptions in Table 1. Details are not described herein again.

TABLE 2

| Number of spatial streams | CSD value of each spatial stream (unit: nanosecond, (ns)) | | | | | | | |
|---|---|---|---|---|---|---|---|---|
| | $1^{st}$ stream | $2^{nd}$ stream | $3^{rd}$ stream | $4^{th}$ stream | $5^{th}$ stream | $6^{th}$ stream | $7^{th}$ stream | $8^{th}$ stream |
| 1 | 0 | — | — | — | — | — | — | — |
| 2 | 0 | −400 | — | — | — | — | — | — |
| 3 | 0 | −400 | −200 | — | — | — | — | — |
| 4 | 0 | −400 | −200 | −600 | — | — | — | — |
| 5 | 0 | −400 | −200 | −600 | −350 | — | — | — |
| 6 | 0 | −400 | −200 | −600 | −350 | −650 | — | — |
| 7 | 0 | −400 | −200 | −600 | −350 | −650 | −100 | — |
| 8 | 0 | −400 | −200 | −600 | −350 | −650 | −100 | −750 |

It should be noted that the "spatial stream" in this application may also be referred to as a "space-time stream", and the two may replace each other. This is not specifically limited in this application.

As communication requirements increase, current eight spatial streams are no longer able to meet some communication requirements. In view of this, this application provides a CSD-based communication method, to expand the spatial streams to more than 8, so as to improve spectral efficiency. In addition, a corresponding CSD after an expanded spatial stream is provided in this application can reduce a gain setting error.

The following describes the technical solutions in embodiments of this application with reference to the accompanying drawings in embodiments of this application.

A cyclic shift diversity-based method provided in embodiments of this application may be applied to a first communication system. The first communication system may be a WLAN system or another communication system, and supports a first communication protocol. The first communication protocol is a new communication protocol relative to a second communication protocol. For example, the first communication protocol may be the 802.11be protocol or a new communication protocol relative to the 802.11be protocol, and the second communication protocol may be one or more of 802.11ax, 802.11ac, 802.11n, 802.11g, 802.11b, and 802.11a.

Figure 5A:
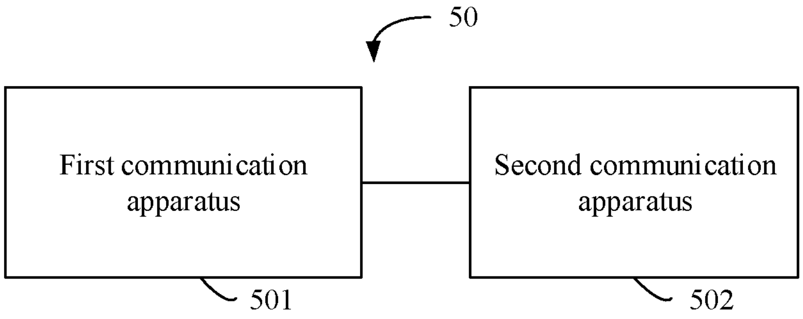

A maximum number of spatial streams defined in the first communication protocol is L. L is a positive integer greater than 8. In other words, the maximum number of spatial streams may be expanded more than 8, for example, 16 in the first communication protocol. Optionally, FIG. 5*a* is a schematic diagram of a structure of a first communication system 50 according to this application. The first communication system 50 includes at least one first communication apparatus 501 and at least one second communication apparatus 502.

The first communication apparatus 501 supports the first communication protocol (for example, the 802.11be protocol). In other words, a maximum number of spatial streams supported by the first communication apparatus 501 is L. Further, the first communication apparatus 501 may further support a plurality of WLAN protocols such as 802.11ax, 802.11ac, 802.11n, 802.11g, 802.11b, and 802.11a.

The second communication apparatus 502 supports the first communication protocol (for example, the 802.11be protocol). In other words, a maximum number of spatial streams supported by the second communication apparatus is L. Further, the second communication apparatus 502 may further support a plurality of WLAN protocols such as 802.11ax, 802.11ac, 802.11n, 802.11g, 802.11b, and 802.11a.

It should be noted that, that the first communication apparatus 501 supports the first communication protocol may also be understood as that the first communication apparatus 501 is a first communication protocol device or the first communication apparatus 501 has or supports a capability specified in the first communication protocol. Similarly, that the second communication apparatus 502 supports the first communication protocol may also be understood as that the second communication apparatus 502 is a first communication protocol device or the second communication apparatus 502 has or supports a capability specified in the first communication protocol. Therefore, in this application, the first communication apparatus 501 may also be referred to as a first communication protocol device 501, for example, an 802.11be device 501, and the second communication apparatus 502 may also be referred to as a second communication protocol device 502, for example, an 802.11be device 502.

Optionally, the first communication apparatus 501 or the second communication apparatus 502 includes at least one affiliated station (affiliated STA). The affiliated station may be an access point station (AP STA) or a non-access point station (non-AP STA). For ease of description, in this application, a communication apparatus whose affiliated station is the AP STA is referred to as an access point, and a communication apparatus whose affiliated station is the non-AP STA is referred to as the non-access point station.

In other words, the first communication apparatus 501 may be the access point, and correspondingly, the second communication apparatus 502 may be the non-access point station. Alternatively, the first communication apparatus 501 may be the non-access point station, and the second communication apparatus 502 may be the access point. Alternatively, both the first communication apparatus 501 and the second communication apparatus 502 are the access points. Alternatively, both the first communication apparatus 501 and the second communication apparatus 502 are the non-access point stations.

Figure 5B:
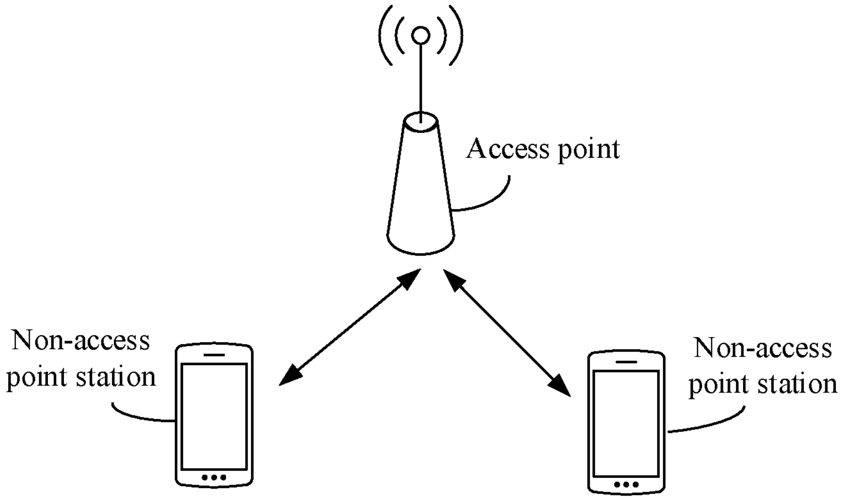

Specifically, for example, one of the first communication apparatus 501 and the second communication apparatus 502 is the access point, and the other is the non-access point station. The first communication system may be shown in FIG. 5*b*.

It should be noted that, in an implementation, the non-AP STA may implement functions of the AP, or the non-AP STA may be operated as the AP. A communication apparatus whose affiliated station is the non-AP STA that can implement the functions of the AP or the non-AP STA that can be operated as the AP may be referred to as a soft access point. The access point in this application may include the soft access point. Certainly, the access point is not limited to the soft access point.

Optionally, the access point in this application may be an access point used by a mobile subscriber to access a wired network, and is mainly deployed in a home, inside a building, and insider a campus, with a typical coverage radius of tens of meters to hundreds of meters. Certainly, the access point may alternatively be deployed outdoors. The access point is equivalent to a bridge that connects the wired network and a wireless network. A main function of the access point is to connect various wireless network clients together and then connect the wireless network to the Ethernet. Specifically, the access point may be a terminal device or a network device with a wireless fidelity (Wi-Fi) chip.

The access point may support the first communication protocol (for example, the 802.11be protocol). Further, the access point may further support a plurality of WLAN protocols such as 802.11ax, 802.11ac, 802.11n, 802.11g, 802.11b, and 802.11a.

Optionally, the non-access point station in this application may be a wireless communication chip, a wireless sensor, or a wireless communication terminal. The station is, for example, a mobile phone supporting a Wi-Fi communication function, a tablet computer supporting a Wi-Fi communication function, a set top box supporting a Wi-Fi communication function, a smart television supporting a Wi-Fi communication function, an intelligent wearable device supporting a Wi-Fi communication function, an in-vehicle communication device supporting a Wi-Fi communication function, a computer supporting a Wi-Fi communication function, and any device supporting a Wi-Fi communication function. This is not limited in this application.

The non-access point station may support the first communication protocol (for example, the 802.11be protocol). Further, the non-access point station may further support a plurality of WLAN protocols such as 802.11ax, 802.11ac, 802.11n, 802.11g, 802.11b, and 802.11a.

Optionally, the access point in this application may include one or more antennas, that is, the access point may be a single-antenna device or a multi-antenna device. Similarly, the non-access point station may include one or more antennas, that is, the non-access point station may be a single-antenna device or a multi-antenna device.

Optionally, FIG. 6 is a schematic diagram of structures of the access point and the non-access point station. The access point and the station each include a physical layer (PHY) and a medium access control (MAC) layer. The solution in this application is a protocol design at the PHY layer and the MAC layer. It may be understood that FIG. 6 may be considered as division of the access point and the non-access point station from a perspective of a logical function.

Optionally, in specific implementation, the first communication apparatus 501 or the second communication apparatus 502 may be implemented by using a communication apparatus in FIG. 7. FIG. 7 is a schematic diagram of a hardware structure of a communication apparatus 700 according to this application. The communication apparatus 700 includes a processor 701 and at least one communication interface (FIG. 7*a* is described merely by using an example in which the communication apparatus includes a communication interface 704). Optionally, the communication apparatus 700 may further include a communication line 702 and a memory 703.

The processor 701 may be a general-purpose central processing unit (CPU), a microprocessor, an application-specific integrated circuit (ASIC), or one or more integrated circuits configured to control program execution in the solutions of this application.

The communication line 702 may include a path on which information is transmitted between the foregoing components.

The communication interface 704 uses any apparatus such as a transceiver, to communicate with another device or a communication network, for example, the Ethernet, a radio access network (RAN), or a wireless local area network (WLAN).

The memory 703 may be a read-only memory (ROM) or another type of static storage device that can store static information and instructions, a random access memory (RAM) or another type of dynamic storage device that can store information and instructions, an electrically erasable programmable read-only memory (EEPROM), a compact disc read-only memory (CD-ROM) or another optical disc storage, optical disk storage (including compressed optical discs, laser discs, optical discs, digital versatile optical discs, Blu-ray discs, and the like), magnetic disk storage medium or another magnetic storage device, or any other medium capable of carrying or storing desired program code in the form of instructions or data structures and capable of being accessed by a computer, but not limited thereto. The memory may independently exist and is connected to the processor through the communication line 702. Alternatively, the memory may be integrated with the processor.

The memory 703 is configured to store computer-executable instructions for executing the solutions of this application, and the processor 701 controls the execution. The processor 701 is configured to execute the computer-executable instructions stored in the memory 703, to implement a cyclic shift diversity-based communication method provided in the following embodiments of this application.

Optionally, the computer-executable instructions in this embodiment of this application may also be referred to as application program code or computer program code. This is not specifically limited in embodiments of this application.

During specific implementation, in an embodiment, the processor 701 may include one or more CPUs such as a CPU 0 and a CPU 1 shown in FIG. 7.

During specific implementation, in an embodiment, the communication apparatus 700 may include a plurality of processors, for example, the processor 701 and a processor 708 in FIG. 7. Each of the processors may be a single-core processor (single-CPU) or a multi-core processor (multi-CPU). Herein, the processor may be one or more devices, circuits, and/or processing cores configured to process data (for example, computer program instructions).

During specific implementation, in an embodiment, the communication apparatus 700 may further include an output device 705 and an input device 706. The output device 705 communicates with the processor 701, and may display information in a plurality of manners. For example, the output device 705 may be a liquid crystal display (LCD), a light emitting diode (LED) display device, a cathode ray tube (CRT) display device, a projector, or the like. The input device 706 communicates with the processor 701, and may receive an input from a user in a plurality of manners. For example, the input device 706 may be a mouse, a keyboard, a touchscreen device, or a sensor device.

The following uses an example in which a method in this application is applied to the communication system shown in FIG. 5*a*, and describes a cyclic shift diversity-based communication method provided in embodiments of this application with reference to the accompanying drawings.

It should be noted that names of messages between apparatuses, names of parameters in the messages, or the like in the following embodiments of this application are merely examples, and there may be other names during specific implementation. This is not specifically limited in embodiments of this application.

FIG. 8 is a cyclic shift diversity-based communication method according to an embodiment of this application. The method includes the following steps.

S810: A first communication apparatus generates a PPDU.

The PPDU includes a short training field (STF), a long training field (LTF), and a data field.

It should be noted that, in the following embodiments of this application, that the PPDU generated by the first communication apparatus is a PPDU of a first communication protocol, and the STF and the LTF included in the PPDU are respectively a non-legacy STF and a non-legacy LTF is used as an example for description. The non-legacy STF refers to a non-L-STF, and the non-legacy LTF refers to a non-L-LTF.

For example, the first communication protocol is the 802.11be protocol. A frame structure of the PPDU generated by the first communication apparatus may be shown in FIG. 4. In this application, the STF included in the PPDU is an EHT-STF, and the LTF included in the PPDU is an EHT-LTF.

Cyclic shift is performed on at least one of the STF, the LTF, and the data field included in the PPDU based on the CSD, and the CSD includes L elements. According to the foregoing descriptions, L is a maximum number of spatial streams defined in the first communication protocol. If the first communication apparatus supports the first communication protocol, L is also the maximum number of spatial streams supported by the first communication apparatus. The maximum number of spatial streams is greater than 8.

It should be noted that, the maximum number L of spatial streams supported by the first communication apparatus may also be understood as that the first communication apparatus has a capability of sending and receiving L spatial streams, in other words, the first communication apparatus has (have) a maximum of L spatial streams.

Optionally, when generating the PPDU, the first communication apparatus may perform, based on a $k^{th}$ element in the CSD, cyclic shift on at least one field in an original STF sequence, an original LTF sequence, and an original data sequence that correspond to a $k^{th}$ spatial stream, to respectively obtain an STF sequence, an LTF sequence, and a data sequence that are transmitted on the $k^{th}$ spatial stream. The STF sequence, the LTF sequence, and the data sequence are respectively carried in an STF, an LTF, and a data field. k=1, 2, . . . , K. K is a number of spatial streams actually used by the first communication apparatus. For example, when generating the PPDU, the first communication apparatus may perform cyclic shift only on the original STF sequence, may perform cyclic shift only on the original STF sequence and the original LTF sequence, or may perform cyclic shift on all the original STF sequence, the original LTF sequence, and the original data sequence. This is not limited in this application. It should be understood that the "original STF sequence, the original LTF sequence, and the original data sequence" may be understood as a sequence on which no cyclic shift is performed based on the CSD, that is, a sequence before cyclic shift.

In a possible implementation, the maximum number of spatial streams is 16, that is, L is equal to 16. This application provides two types of possible CSDs.

In a possible implementation, a first-type CSD provided in this application includes: 0, −400, −200, −600, −350, −650, −100, −750, −250, −475, −125, −450, −75, −175, −725, and −625. As shown in Table 3 below, CSD values of 1 to 16 streams are defined.

TABLE 3

| | CSD value of each spatial stream (unit: nanosecond, (ns)) | | | | | | | |
|---|---|---|---|---|---|---|---|---|
| Number of spatial streams | $1^{st}$ stream | $2^{nd}$ stream | $3^{rd}$ stream | $4^{th}$ stream | $5^{th}$ stream | $6^{th}$ stream | $7^{th}$ stream | $8^{th}$ stream |
| 1 | 0 | — | — | — | — | — | — | — |
| 2 | 0 | −400 | — | — | — | — | — | — |
| 3 | 0 | −400 | −200 | — | — | — | — | — |
| 4 | 0 | −400 | −200 | −600 | — | — | — | — |
| 5 | 0 | −400 | −200 | −600 | −350 | — | — | — |
| 6 | 0 | −400 | −200 | −600 | −350 | −650 | — | — |
| 7 | 0 | −400 | −200 | −600 | −350 | −650 | −100 | — |
| 8 | 0 | −400 | −200 | −600 | −350 | −650 | −100 | −750 |
| 9 | 0 | −400 | −200 | −600 | −350 | −650 | −100 | −750 |
| 10 | 0 | −400 | −200 | −600 | −350 | −650 | −100 | −750 |
| 11 | 0 | −400 | −200 | −600 | −350 | −650 | −100 | −750 |
| 12 | 0 | −400 | −200 | −600 | −350 | −650 | −100 | −750 |
| 13 | 0 | −400 | −200 | −600 | −350 | −650 | −100 | −750 |
| 14 | 0 | −400 | −200 | −600 | −350 | −650 | −100 | −750 |
| 15 | 0 | −400 | −200 | −600 | −350 | −650 | −100 | −750 |
| 16 | 0 | −400 | −200 | −600 | −350 | −650 | −100 | −750 |

| | CSD value of each spatial stream (unit: nanosecond, (ns)) | | | | | | | |
|---|---|---|---|---|---|---|---|---|
| Number of spatial streams | $9^{th}$ stream | $10^{th}$ stream | $11^{th}$ stream | $12^{th}$ stream | $13^{th}$ stream | $14^{th}$ stream | $15^{th}$ stream | $16^{th}$ stream |
| 1 | — | — | — | — | — | — | — | — |
| 2 | — | — | — | — | — | — | — | — |
| 3 | — | — | — | — | — | — | — | — |
| 4 | — | — | — | — | — | — | — | — |
| 5 | — | — | — | — | — | — | — | — |
| 6 | — | — | — | — | — | — | — | — |
| 7 | — | — | — | — | — | — | — | — |
| 8 | — | — | — | — | — | — | — | — |
| 9 | −250 | — | — | — | — | — | — | — |
| 10 | −250 | −475 | — | — | — | — | — | — |

TABLE 3-continued

| | | | | | | | | |
|---|---|---|---|---|---|---|---|---|
| 11 | −250 | −475 | −125 | — | — | — | — | — |
| 12 | −250 | −475 | −125 | −450 | — | — | — | — |
| 13 | −250 | −475 | −125 | −450 | −75 | — | — | — |
| 14 | −250 | −475 | −125 | −450 | −75 | −175 | — | — |
| 15 | −250 | −475 | −125 | −450 | −75 | −175 | −725 | — |
| 16 | −250 | −475 | −125 | −450 | −75 | −175 | −725 | −625 |

The first-type CSD can be compatible with the 802.11n protocol, the 802.11ac protocol, or the 802.11ax protocol. This facilitates smooth evolution of a system. In addition, when the CSD is compatible with the 802.11n protocol and a data packet of the 802.11n protocol needs to be sent, or when the CSD is compatible with the 802.11ac/802.11ax protocol and a data packet of the 802.11ac/802.11ax protocol needs to be sent, cyclic shift may be directly performed based on the CSD provided in this application. This can reduce implementation complexity, compared with cyclic shift separately performed on data packets of corresponding standards based on a plurality of standard CSDs.

In another possible implementation, a second-type CSD provided in this application includes: 0, −425, −200, −650, −475, −300, −625, −225, −150, −525, −50, −25, −375, −400, −550, and −325. As shown in Table 4 below, other CSD values of 1 to 16 streams are defined.

TABLE 4

| Number of spatial streams | CSD value of each spatial stream (unit: nanosecond, (ns)) | | | | | | | |
|---|---|---|---|---|---|---|---|---|
| | $1^{st}$ stream | $2^{nd}$ stream | $3^{rd}$ stream | $4^{th}$ stream | $5^{th}$ stream | $6^{th}$ stream | $7^{th}$ stream | $8^{th}$ stream |
| 1 | 0 | — | — | — | — | — | — | — |
| 2 | 0 | −425 | — | — | — | — | — | — |
| 3 | 0 | −425 | −200 | — | — | — | — | — |
| 4 | 0 | −425 | −200 | −650 | — | — | — | — |
| 5 | 0 | −425 | −200 | −650 | −475 | — | — | — |
| 6 | 0 | −425 | −200 | −650 | −475 | −300 | — | — |
| 7 | 0 | −425 | −200 | −650 | −475 | −300 | −625 | — |
| 8 | 0 | −425 | −200 | −650 | −475 | −300 | −625 | −225 |
| 9 | 0 | −425 | −200 | −650 | −475 | −300 | −625 | −225 |
| 10 | 0 | −425 | −200 | −650 | −475 | −300 | −625 | −225 |
| 11 | 0 | −425 | −200 | −650 | −475 | −300 | −625 | −225 |
| 12 | 0 | −425 | −200 | −650 | −475 | −300 | −625 | −225 |
| 13 | 0 | −425 | −200 | −650 | −475 | −300 | −625 | −225 |
| 14 | 0 | −425 | −200 | −650 | −475 | −300 | −625 | −225 |
| 15 | 0 | −425 | −200 | −650 | −475 | −300 | −625 | −225 |
| 16 | 0 | −425 | −200 | −650 | −475 | −300 | −625 | −225 |

| Number of spatial streams | CSD value of each spatial stream (unit: nanosecond, (ns)) | | | | | | | |
|---|---|---|---|---|---|---|---|---|
| | $9^{th}$ stream | $10^{th}$ stream | $11^{th}$ stream | $12^{th}$ stream | $13^{th}$ stream | $14^{th}$ stream | $15^{th}$ stream | $16^{th}$ stream |
| 1 | — | — | — | — | — | — | — | — |
| 2 | — | — | — | — | — | — | — | — |
| 3 | — | — | — | — | — | — | — | — |
| 4 | — | — | — | — | — | — | — | — |
| 5 | — | — | — | — | — | — | — | — |
| 6 | — | — | — | — | — | — | — | — |
| 7 | — | — | — | — | — | — | — | — |
| 8 | — | — | — | — | — | — | — | — |
| 9 | −150 | — | — | — | — | — | — | — |
| 10 | −150 | −525 | — | — | — | — | — | — |
| 11 | −150 | −525 | −50 | — | — | — | — | — |
| 12 | −150 | −525 | −50 | −25 | — | — | — | — |
| 13 | −150 | −525 | −50 | −25 | −375 | — | — | — |
| 14 | −150 | −525 | −50 | −25 | −375 | −400 | — | — |
| 15 | −150 | −525 | −50 | −25 | −375 | −400 | −550 | — |
| 16 | −150 | −525 | −50 | −25 | −375 | −400 | −550 | −325 |

The second-type CSD determines a criterion value based on a change range of a ratio of the power of the STF to power of a corresponding data field, and the CSD is determined based on a smallest criterion value in a plurality of criterion values. A smaller change range of the ratio of the power of the STF to the power of the data field indicates better CSD effect. The CSD provided in this application can reduce the AGC gain setting error.

Optionally, a sequence of the last eight elements included in the first-type CSD may be randomly arranged. For example, the sequence of the last eight elements may be: −475, −125, −250, −450, −75, −175, −725, and −625. Alternatively, the sequence of the last eight elements may be: −725, −250, −475, −125, −450, −75, −175, and −625. It should be noted that the sequence of the last eight elements included in the CSD is merely an example for description. This is not limited in this application.

Optionally, a sequence of the 16 elements included in the second-type CSD may also be randomly arranged. For example, the sequence of the 16 elements included in the CSD may be: 0, −425, −650, −475, −300, −625, −225, −150, −200, −525, −50, −25, −375, −400, −550, −325. Alternatively, the sequence of the 16 elements included in the CSD may be: 0, −425, −625, −200, −650, −25, −475, −300, −225, −150, −525, −50, −375, −400, −550, −325, and the like. The sequence of the 16 elements included in the CSD is merely an example for description. This is not specifically limited in this application.

Optionally, an element in the CSD is in a unit of nanosecond (ns). With development or evolution of communication technologies, the element in the CSD may be in another time unit, for example, microsecond (s). This is not specifically limited in this application.

S820: The first communication apparatus sends the PPDU to a second communication apparatus. Correspondingly, the second communication apparatus receives the PPDU from the first communication apparatus.

Optionally, the first communication apparatus sends the PPDU to the second communication apparatus over K spatial streams. Correspondingly, the second communication apparatus receives the PPDU from the first communication apparatus. K is a positive integer less than or equal to L. It should be noted that, when the PPDU is sent to the second communication apparatus over the K spatial streams, a data part of the PPDU is divided into K parts that are respectively sent on the K spatial streams. A preamble part of the PPDU other than the data part is not limited in this application.

In other words, the first communication apparatus may send the PPDU over less than L spatial streams. In an actual application, due to complex and diversified channel environments, according to this solution, when sending the PPDU, the first communication apparatus may determine, based on an actual channel condition, to send the PPDU over less than L spatial streams, so as to maximize the spectral efficiency as much as possible. When a channel condition is good, K may be equal to L, to be specific, the first communication apparatus sends the PPDU over the L spatial streams, to maximize the spectral efficiency.

It should be noted that, when the first communication apparatus sends the PPDU over the K spatial streams, and K is less than the maximum number of spatial streams supported by the first communication apparatus, cyclic shift values corresponding to the K spatial streams may be any K of the CSD values provided above. A one-to-one correspondence between the K spatial streams and the first K values of the CSD is not necessarily strictly followed. For example, when the maximum number of spatial streams supported by the first communication apparatus is 16, the first communication apparatus sends the PPDU over eight streams. In this case, eight values of the CSD may be randomly selected to perform cyclic shift. Similarly, when the first communication apparatus sends the PPDU over the maximum number of spatial streams supported by the first communication apparatus, a correspondence between each spatial stream of the first communication apparatus and a value in the CSD is not strictly limited. In other words, the correspondence between each spatial stream and the value in the CSD is not limited in this application.

In addition, the first communication apparatus may also support a plurality of communication protocols. For example, the first communication apparatus supports both the first communication protocol and the second communication protocol, and the first communication apparatus may still use the CSD provided in this application. In other words, the CSD provided in this application can implement compatibility between different protocols.

Optionally, when the first communication apparatus sends the PPDU to the second communication apparatus over the K spatial streams, at least one of the STF, the LTF, and the data field of the PPDU may be obtained after cyclic shift is performed on the first K elements of the CSD.

Optionally, when receiving the PPDU, the second communication apparatus may set an AGC gain based on receive power of an STF on each spatial stream, and use the gain to adjust power of a data field on a corresponding spatial stream. Because the first communication apparatus in this application performs cyclic shift on the at least one of the STF, the LTF, and the data field based on the CSD, a correlation between STFs of different spatial streams is reduced. Therefore, when the second communication apparatus adjusts the power of the corresponding data field based on the receive power of the STF of the spatial stream, an error is relatively low.

S830: The second communication apparatus performs processing based on the PPDU.

Optionally, the second communication apparatus may process a service based on data carried in the data field of the PPDU. This is not specifically limited in this application.

In the technical solutions provided in this application, in one aspect, compared with a maximum of eight spatial streams, the maximum number of spatial streams may be expanded to more than 8, for example, 16. Therefore, this solution is applicable to a communication scenario with a high communication requirement and a large amount of data. This improves a system capacity and spectral efficiency. In another aspect, based on a maximum number of expanded spatial streams in this application, a corresponding CSD is further used to perform cyclic shift on at least one of the STF, the LTF, and the data field in this application, to reduce an AGC gain setting error when an AGC gain is determined based on the power of the STF.

The following provides a CSD determining method, and a corresponding CSD when a number of spatial streams is more than eight may be determined according to the method. It should be noted that all CSDs determined according to the method provided in this application fall within the protection scope of this application.

As shown in FIG. 9, the CSD determining method provided in this application may include the following steps.

S910: Determine a discrete time set.

Optionally, a range of the discrete time set is determined based on a period of the STF. For example, a maximum element in the discrete time set is less than or equal to a period of the STF.

Optionally, time intervals between any two adjacent elements in the discrete time set may be equal. In this case, a quotient of the period of the STF divided by the time interval is a number of elements included in the discrete time set, and all elements in the discrete time set are multiples of the time interval.

For example, it is assumed that the period of the STF is 800 ns, and the range of the discrete time set is [0, −800). If the time interval is −25 ns, the discrete time set is [0 −25 −50 −75 −100 −125 −150 −175 −200 −225 −250 −275 −300 −325 −350 −375 −400 −425 −450 −475 −500 −525 −550 −575 −600 −625 −650 −675 −700 −725 −750 −775].

It may be understood that, in this example, the time interval may alternatively be another value, for example, −12.5 ns or −6.25 ns. This is not specifically limited in this application.

S920: Determine a first initial set and a second initial set.

The second initial set includes Y elements in the discrete time set. The first initial set includes elements other than the Y elements in the discrete time set.

S930: Perform selection for X times based on the first initial set and the second initial set, to obtain the CSD.

The first Y elements in the CSD are Y elements constituting the second initial set, and X is equal to L −Y For example, if L is equal to 16, and Y is equal to 8, X is equal to 8, that is, selection is performed for eight times based on the first initial set and the second initial set.

Optionally, during selection for the $x^{th}$ time:

First, an $m^{th}$ element in an $x^{th}$ candidate set is added to the first Y+x −1 elements in the CSD, to obtain an $m^{th}$ selected set. m=1, 2, . . . , M. M is a number of elements included in the $x^{th}$ candidate set. A candidate set is a subset of the first initial set. x=1, 2, . . . , X.

Then, a target selected set is selected from M selected sets, and elements constituting the target selected set are used as the first Y+x elements in the CSD.

It should be noted that, when x is equal to 1, a $1^{st}$ candidate set is the first initial set.

For example, the Y elements included in the second initial set may form a CSD defined in a second communication protocol. For example, the second communication protocol is the 802.11ac protocol or the 802.11ax protocol. Y is equal to 8. The second initial set is [0 −400 −200 −600 −350 −650 −100 −750]. Based on the discrete time set shown in step S910, the first initial set is [−25 −50 −75 −125 −150 −175 −225 −250 −275 −300 −325 −375 −425 −450 −475 −500 −525 −550 −575 −625 −675 −700 −725 −775].

During selection for the first time:

a $1^{st}$ candidate set is [−25 −50 −75 −125 −150 −175 −225 −250 −275 −300 −325 −375 −425 −450 −475 −500 −525 −550 −575 −625 −675 −700 −725 −775]. M is equal to 24.

The first Y+x −1=8 elements in the CSD are 0, −400, −200, −600, −350, −650, −100, and −750.

M elements in the $1^{st}$ candidate set are respectively added after the first eight elements in the CSD; in other words, one of the M elements in the $1^{st}$ candidate set is newly added to the second initial set, to obtain the following M selected sets:

a $1^{st}$ selected set is [0 −400 −200 −600 −350 −650 −100 −750 −25];

a $2^{nd}$ selected set is [0 −400 −200 −600 −350 −650 −100 −750 −50];

a $3^{rd}$ selected set is [0 −400 −200 −600 −350 −650 −100 −750 −75];

a $4^{th}$ selected set is [0 −400 −200 −600 −350 −650 −100 −750 −125];

a $5^{th}$ selected set is [0 −400 −200 −600 −350 −650 −100 −750 −150];

a $6^{th}$ selected set is [0 −400 −200 −600 −350 −650 −100 −750 −175];

a $7^{th}$ selected set is [0 −400 −200 −600 −350 −650 −100 −750 −225];

an $8^{th}$ selected set is [0 −400 −200 −600 −350 −650 −100 −750 −250];

a $9^{th}$ selected set is [0 −400 −200 −600 −350 −650 −100 −750 −275];

a $10^{th}$ selected set is [0 −400 −200 −600 −350 −650 −100 −750 −300];

an $11^{th}$ selected set is [0 −400 −200 −600 −350 −650 −100 −750 −325];

a $12^{th}$ selected set is [0 −400 −200 −600 −350 −650 −100 −750 −375];

a $13^{th}$ selected set is [0 −400 −200 −600 −350 −650 −100 −750 −425];

a $14^{th}$ selected set is [0 −400 −200 −600 −350 −650 −100 −750 −450];

a $15^{th}$ selected set is [0 −400 −200 −600 −350 −650 −100 −750 −475];

a $16^{th}$ selected set is [0 −400 −200 −600 −350 −650 −100 −750 −500];

a $17^{th}$ selected set is [0 −400 −200 −600 −350 −650 −100 −750 −525];

an $18^{th}$ selected set is [0 −400 −200 −600 −350 −650 −100 −750 −550];

a $19^{th}$ selected set is [0 −400 −200 −600 −350 −650 −100 −750 −575];

a $20^{th}$ selected set is [0 −400 −200 −600 −350 −650 −100 −750 −625];

a $21^{st}$ selected set is [0 −400 −200 −600 −350 −650 −100 −750 −675];

a $22^{nd}$ selected set is [0 −400 −200 −600 −350 −650 −100 −750 −700];

a $23^{rd}$ selected set is [0 −400 −200 −600 −350 −650 −100 −750 −725]; and a $24^{th}$ selected set is [0 −400 −200 −600 −350 −650 −100 −750 −775].

The target selected set selected from the M selected sets is a selected set corresponding to the smallest criterion value in the M selected sets. Optionally, the criterion value is determined by a second communication apparatus based on a change range of a ratio of receive power of the STF of a spatial stream to power of a data field of the spatial stream.

A specific method for determining a criterion value $P_m$ corresponding to the $m^{th}$ selected set includes:

in a plurality of different channel scenarios, a first communication apparatus generates a PPDU, where the PPDU includes an STF, an LTF, and a data field. Cyclic shift is performed on at least one of the STF, the LTF, and the data field based on a CSD that includes elements in the $m^{th}$ selected set, and the first communication apparatus sends the PPDU to the second communication apparatus over K spatial streams. The second communication apparatus receives the PPDU sent by the first communication apparatus, and K is equal to a number of elements in the $m^{th}$ selected set. The second communication apparatus calculates a statistical power ratio by using the following method:

$$E_{AGC} = 10\log_{10}\left(\frac{\text{mean}(|X_i|^2)}{\text{mean}(|Y_i|^2)}\right)$$

$E_{AGC}$ represents a statistical power ratio, $X_i$ represents power, of the STF, received by the second communication apparatus, $Y_i$ represents power, of the data field, received by the second communication apparatus, i is a sampling sequence number, and mean represents an average value function of power corresponding to a plurality of sample points. It should be understood that $Y_i$ is power of a data field on which no power adjustment is performed.

The plurality of different channel scenarios may include the following scenarios:

Scenario 1: In a 20 megahertz (MHz) system bandwidth, an initial phase difference between odd and even transmit antennas is 0 degrees by using a channel model B, that is, an 802.11n-channel model B.

Scenario 2: In a 20 megahertz (MHz) system bandwidth, an initial phase difference between odd and even transmit antennas is 180 degrees by using a channel model B.

Scenario 3: In a 20 megahertz (MHz) system bandwidth, an initial phase difference between odd and even transmit antennas is 0 degrees by using a channel model C, that is, an 802.11n-channel model C.

Scenario 4: In a 20 megahertz (MHz) system bandwidth, an initial phase difference between odd and even transmit antennas is 180 degrees by using a channel model C.

Scenario 5: In a 20 megahertz (MHz) system bandwidth, an initial phase difference between odd and even transmit antennas is 0 degrees by using a channel model D, that is, an 802.11n-channel model D.

Scenario 6: In a 20 megahertz (MHz) system bandwidth, an initial phase difference between odd and even transmit antennas is 180 degrees by using a channel model D.

Scenario 7: In a 20 megahertz (MHz) system bandwidth, an initial phase difference between odd and even transmit antennas is 0 degrees by using a channel model E, that is, an 802.11n-channel model E.

Scenario 8: In a 20 megahertz (MHz) system bandwidth, an initial phase difference between odd and even transmit antennas is 180 degrees by using a channel model E.

In the different channel scenarios, it is determined, through measurement calculation on $E_{AGC}$ for a plurality of times and based on $E_{AGC}$ whose probability result in a cumulative distribution function (CDF) of $E_{AGC}$ is between 2.5% and 97.5%, that a maximum error value of $E_{AGC}$ is the criterion value $P_m$ corresponding to the $m^{th}$ selected set. The maximum error value of $E_{AGC}$ is a difference between a maximum value and a minimum value of $E_{AGC}$ whose probability result is between 2.5% and 97.5% in the CDF.

It should be understood that a smaller maximum error value (the criterion value) of $E_{AGC}$ indicates more stable receive power of the STF of the spatial stream, that is, a smaller correlation between STFs of different spatial streams, so that an AGC gain setting error may be smaller, that is, performance of a corresponding CSD is better; and a larger maximum error value of $E_{AGC}$ indicates a larger change range of the power of the STF, so that the AGC gain setting error is large, that is, performance of a corresponding CSD is poor.

Maximum error values $P_1$ to $P_M$ of $E_{AGC}$ corresponding to the M selected sets are determined by using the foregoing method, that is, criterion values $P_1$ to $P_M$ corresponding to M selected sets, and a selected set with a smallest criterion value is determined as a target selected set based on $P_1$ to $P_M$.

For example, during selection for the first time, it is determined through calculation that a criterion value $P_8$ corresponding to an $8^{th}$ selected set is the smallest, that is, [0–400 –200 –600 –350 –650 –100 –750 –250] is a target selected set determined during selection for the first time. Therefore, [0 –400 –200 –600 –350 –650 –100 –750 –250] is to constitute the first nine elements of the CSD.

During selection for the second time:

a $2^{nd}$ candidate set is [–25 –50 –75 –125 –150 –175 –225 –275 –300 –325 –375 –425 –450 –475 –500 –525 –550 –575 –625 –675 –700 –725 –775]. M is equal to 23.

The first Y+x –1=9 elements in the CSD are 0, –400, –200, –600, –350, –650, –100, –750, and –250.

M elements in the $2^{nd}$ candidate set are respectively added to the first nine elements in the CSD, to obtain the following 23 selected sets:

a $1^{st}$ selected set is [0 –400 –200 –600 –350 –650 –100 –750 –250 –25];

a $2^{nd}$ selected set is [0 –400 –200 –600 –350 –650 –100 –750 –250 –50];

a $22^{nd}$ selected set is [0 –400 –200 –600 –350 –650 –100 –750 –250 –725]; and a $23^{rd}$ selected set is [0 –400 –200 –600 –350 –650 –100 –750 –250 –775].

Then, criterion values that correspond to the 23 selected sets are calculated, and a target selected set in the 23 selected sets is selected to obtain the first 10 elements in the CSD, or a CSD corresponding to 10 spatial streams. Next, the foregoing process is repeated until an $L^{th}$ element in the CSD is obtained, or until the CSD includes the L elements.

For example, when L is equal to 16, a CSD that corresponds to 16 streams and that is obtained by using the foregoing method includes: [0, –400, –200, –600, –350, –650, –100, –750, –250, –475, –125, –450, –75, –175, –725, –625]. The CSD can be compatible with the 802.11n protocol, the 802.11ac protocol, or the 802.11ax protocol. This facilitates smooth evolution of a system. A sequence of the last eight elements included in the CSD may be randomly arranged. This is not specifically limited in this application.

Table 5 shows maximum error values of $E_{AGC}$ measured in all channel scenarios when the CSD corresponding to the 16 spatial streams is [0, –400, –200, –600, –350, –650, –100, –750, –250, –475, –125, –450, –75, –175, –725, –625]. It can be learned from Table 5 that, cyclic shift performed based on the CSD may make the maximum error value of $E_{AGC}$ small, and a ratio of the power of the STF to the power of the data changes within a small range, so that the AGC gain setting error can be reduced.

TABLE 5

| Number of streams-phase difference between odd and even antennas | Bandwidth-channel model | | | | | | | |
|---|---|---|---|---|---|---|---|---|
| | 20 MHz-B | 20 MHz-C | 20 MHz-D | 20 MHz-E | 40 MHz-B | 40 MHz-C | 40 MHz-D | 40 MHz-E |
| 9-0 degrees | 2.86 | 3.46 | 3.69 | 4.02 | 1.55 | 1.93 | 1.88 | 2.52 |
| 9-180 degrees | 2.84 | 3.52 | 3.44 | 3.88 | 2.39 | 2.91 | 2.28 | 2.64 |
| 10-0 degrees | 2.64 | 3.14 | 3.38 | 3.96 | 1.51 | 2.03 | 2.01 | 2.6 |
| 10-180 degrees | 3.3 | 4.15 | 3.35 | 3.91 | 2.21 | 3.06 | 2.16 | 2.68 |
| 11-0 degrees | 2.8 | 3.28 | 3.62 | 3.88 | 1.77 | 2.36 | 2.17 | 2.68 |
| 11-180 degrees | 3.27 | 4.09 | 3.23 | 4.17 | 2.33 | 2.91 | 2.34 | 2.69 |
| 12-0 degrees | 3.37 | 3.52 | 3.84 | 3.77 | 2 | 2.22 | 2.27 | 2.45 |
| 12-180 degrees | 3.14 | 3.89 | 3.59 | 3.95 | 2.61 | 2.98 | 2.34 | 2.75 |
| 13-0 degrees | 3.47 | 3.91 | 3.66 | 3.85 | 2.17 | 2.51 | 2.35 | 2.59 |
| 13-180 degrees | 3.82 | 4.14 | 3.39 | 4.12 | 2.49 | 2.81 | 2.54 | 2.83 |
| 14-0 degrees | 3.51 | 4.18 | 3.82 | 3.88 | 2.33 | 2.38 | 2.62 | 2.95 |
| 14-180 degrees | 3.27 | 3.95 | 4.13 | 4.07 | 2.91 | 2.92 | 2.46 | 2.81 |
| 15-0 degrees | 3.56 | 3.79 | 3.8 | 4.17 | 2.27 | 2.25 | 2.55 | 2.71 |
| 15-180 degrees | 3.31 | 3.97 | 3.91 | 3.91 | 2.65 | 3.3 | 2.49 | 3.07 |
| 16-0 degrees | 3.65 | 4.08 | 3.94 | 3.96 | 2.42 | 2.19 | 2.71 | 2.89 |
| 16-180 degrees | 3.44 | 3.88 | 4.08 | 3.93 | 3.04 | 2.71 | 2.46 | 2.93 |

In still another possible implementation, that the first initial set is [−25 −50 −75 −100 −125 −150 −175 −200 −225 −250 −275 −300 −325 −350 −375 −400 −425 −450 −475 −500 −525 −550 −575 −600 −625 −650 −675 −700 −725 −750 −775] and the second initial set is [0] is used as an example.

During selection for the first time:

a 1st candidate set is [−25 −50 −75 −100 −125 −150 −175 −200 −225 −250 −275 −300 −325 −350 −375 −400 −425 −450 −475 −500 −525 −550 −575 −600 −625 −650 −675 −700 −725 −750 −775]. M is equal to 31. The first Y+x −1=1 element of the CSD is 0.

M elements in the 1st candidate set are respectively added after the 1st element in the CSD; in other words, one of the M elements in the 1st candidate set is newly added to the second initial set, to obtain M selected sets.

Criterion values corresponding to the M selected sets are determined according to the foregoing method, and a selected set with a smallest criterion value is determined as a target selected set. For example, during selection for the first time, it is determined through calculation that a selected set that corresponds to a smallest criterion value and that is in the 31 selected sets is [0 −425]. Therefore, [0 −425] is to constitute the first two elements of the CSD.

During selection for the second time:

a 2nd candidate set is: [−25 −50 −75 −100 −125 −150 −175 −200 −225 −250 −275 −300 −325 −350 −375 −400 −450 −475 −500 −525 −550 −575 −600 −625 −650 −675 −700 −725 −750 −775]. M is equal to 30. The first Y+x −1=2 elements of the CSD are 0 and −425.

M elements in the 2nd candidate set are respectively added to the first two elements in the CSD, to obtain 30 selected sets: Criterion values that correspond to the 30 selected sets are calculated, and a target selected set in the 30 selected sets is selected to obtain the first 3 elements in the CSD, or a CSD corresponding to three spatial streams. Next, the foregoing process is repeated until an L'h element in the CSD is obtained, or until the CSD includes the L elements.

For example, when L is equal to 16, a CSD that corresponds to 16 streams and that is obtained by using the foregoing method includes: [0, −425, −200, −650, −475, −300, −625, −225, −150, −525, −50, −25, −375, −400, −550, −325]. Optionally, a sequence of the 16 elements included in the CSD may be randomly arranged.

Table 6 shows maximum error values of $E_{AGC}$ measured in all channel scenarios when the CSD corresponding to the 16 spatial streams is [0, −425, −200, −650, −475, −300, −625, −225, −150, −525, −50, −25, −375, −400, −550, −325]. It can be learned from Table 6 that, cyclic shift performed based on the CSD may make the maximum error value of $E_{AGC}$ be smaller than that in the conventional technology, and a ratio of the power of the STF to the power of the data changes within a small range, so that the AGC gain setting error can be reduced.

TABLE 6

| Number of streams-phase difference between odd and even antennas | Bandwidth-channel model | | | | | | | |
|---|---|---|---|---|---|---|---|---|
| | 20 MHz-B | 20 MHz-C | 20 MHz-D | 20 MHz-E | 40 MHz-B | 40 MHz-C | 40 MHz-D | 40 MHz-E |
| 1-0 degrees | 0.23 | 0.52 | 0.74 | 0.78 | 0.3 | 0.39 | 0.33 | 0.42 |
| 1-180 degrees | 0.23 | 0.52 | 0.74 | 0.78 | 0.3 | 0.39 | 0.33 | 0.42 |
| 2-0 degrees | 1.39 | 0.57 | 1.03 | 1.75 | 0.5 | 0.54 | 0.6 | 1.3 |
| 2-180 degrees | 1.07 | 1.24 | 1.25 | 1.75 | 0.55 | 1.1 | 0.68 | 1.1 |
| 3-0 degrees | 1.55 | 1.52 | 1.94 | 2.61 | 0.59 | 0.67 | 0.97 | 1.78 |
| 3-180 degrees | 1.57 | 1.92 | 2.25 | 2.85 | 0.93 | 1.06 | 1.11 | 1.86 |
| 4-0 degrees | 1.44 | 1.41 | 1.91 | 2.94 | 0.79 | 0.81 | 1.3 | 1.93 |
| 4-180 degrees | 1.23 | 3.11 | 2.42 | 3 | 0.91 | 1.43 | 1.27 | 1.95 |
| 5-0 degrees | 2.29 | 2.6 | 2.84 | 3.1 | 1.21 | 1.54 | 1.82 | 2.32 |
| 5-180 degrees | 2.16 | 2.89 | 2.79 | 3.01 | 1.49 | 2.04 | 2.04 | 2 |
| 6-0 degrees | 2.64 | 2.35 | 2.62 | 3.33 | 1.22 | 1.62 | 2.16 | 2.49 |
| 6-180 degrees | 2.8 | 3.34 | 3.46 | 3.11 | 1.75 | 2.18 | 1.97 | 2.18 |
| 7-0 degrees | 2.72 | 3.04 | 3.1 | 3.57 | 2 | 2.02 | 1.98 | 2.46 |
| 7-180 degrees | 2.92 | 3.5 | 3.85 | 3.51 | 2.29 | 2.12 | 2.22 | 2.68 |
| 8-0 degrees | 3.18 | 3.6 | 3.4 | 3.48 | 2.01 | 2.13 | 2.28 | 2.58 |
| 8-180 degrees | 2.99 | 2.9 | 3.66 | 3.7 | 2.34 | 2.36 | 2.64 | 2.65 |
| 9-0 degrees | 2.88 | 3.59 | 3.5 | 3.95 | 1.96 | 2.13 | 2.14 | 2.75 |
| 9-180 degrees | 3.22 | 3.56 | 3.56 | 3.67 | 2.69 | 2.46 | 2.9 | 2.71 |
| 10-0 degrees | 2.99 | 3.46 | 3.65 | 3.71 | 1.84 | 2.38 | 2.1 | 2.73 |
| 10-180 degrees | 3.27 | 3.42 | 3.45 | 3.91 | 2.46 | 2.47 | 2.7 | 2.85 |
| 11-0 degrees | 3.09 | 3.23 | 3.3 | 3.77 | 1.93 | 2.34 | 2.11 | 2.44 |
| 11-180 degrees | 3.74 | 3.56 | 3.28 | 4.01 | 2.6 | 2.77 | 2.5 | 2.84 |
| 12-0 degrees | 3.31 | 3.89 | 3.52 | 3.71 | 2.07 | 2.54 | 2.05 | 2.84 |
| 12-180 degrees | 3.13 | 3.29 | 3.43 | 3.87 | 2.37 | 2.54 | 2.48 | 2.6 |
| 13-0 degrees | 3.04 | 3.57 | 3.71 | 3.68 | 1.92 | 2.65 | 2.07 | 2.7 |
| 13-180 degrees | 3.33 | 3.61 | 3.89 | 3.55 | 2.54 | 2.7 | 2.61 | 2.43 |
| 14-0 degrees | 3.33 | 3.26 | 4 | 3.61 | 2.65 | 2.59 | 2.22 | 2.84 |
| 14-180 degrees | 3.5 | 3.23 | 3.73 | 3.75 | 2.62 | 2.44 | 2.58 | 2.72 |
| 15-0 degrees | 3.47 | 3.48 | 3.99 | 3.93 | 2.36 | 2.61 | 2.48 | 2.9 |
| 15-180 degrees | 3.69 | 3.86 | 3.63 | 3.79 | 2.55 | 2.73 | 2.57 | 2.67 |
| 16-0 degrees | 3.86 | 3.76 | 3.94 | 4.03 | 2.37 | 2.59 | 2.57 | 2.93 |
| 16-180 degrees | 3.74 | 3.81 | 3.37 | 3.86 | 2.54 | 2.99 | 2.57 | 2.49 |

It may be understood that, in the foregoing embodiment of this application, a CSD selection method is described only by using an example in which the period of the STF is 800 ns, the time interval is −25 ns, and L is equal to 16. Certainly, when one or more of the period of the STF, the time interval, and L are other values, the CSD may alternatively be selected by using a method similar to that in FIG. 9. For example, the period of the STF is 800 ns, the time interval is −12.5 ns or −6.25 ns, and L is 32. Alternatively, the period of the STF is 800 ns, the time interval is −12.5 ns or −6.25 ns, and L is 16.

For example, when the period of the STF is 800 ns, the time interval is −12.5 ns or −6.25 ns, and L is 16, compared with the example shown in FIG. 9, the time interval is less than 25 ns, and a number of elements in the discrete time set is greater than 32. When a number of elements included in the second initial set is still 8, the number of elements included in the first initial set is greater than 24. Correspondingly, a number of candidate sets increases during selection for each time.

In conclusion, based on the method shown in FIG. 9, in each selection process, a selected set corresponding to the smallest first criterion value as the first l element in the CSD, so that a correlation between STFs on l spatial stream is small enough, to reduce an AGC gain setting error. l is less than or equal to L.

It should be noted that in the foregoing embodiment, that the maximum number of spatial streams is 16 is used as an example to obtain the corresponding CSD. Similarly, when the maximum number of spatial streams is greater than 8, a corresponding CSD may be determined by using the method provided in this application.

In embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

It may be understood that, in the foregoing embodiments, the methods and/or steps implemented by the first communication apparatus may also be implemented by a component (for example, a chip or a circuit) that can be used in the first communication apparatus, and the methods and/or steps implemented by the second communication apparatus may also be implemented by a component (for example, a chip or a circuit) that can be used in the second communication apparatus.

The foregoing mainly describes the solutions provided in this application from a perspective of interaction between devices. Correspondingly, this application further provides a communication apparatus, and the communication apparatus is configured to implement the foregoing methods. The communication apparatus may be the first communication apparatus in the foregoing method embodiments, or an apparatus including the first communication apparatus, or a component that can be used in the first communication apparatus. Alternatively, the communication apparatus may be the second communication apparatus in the foregoing method embodiments, or an apparatus including the second communication apparatus, or a component that can be used in the second communication apparatus.

It may be understood that, to implement the foregoing functions, the communication apparatus includes a hardware structure and/or a software module for performing a corresponding function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the communication apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

For example, the communication apparatus is the first communication apparatus in the foregoing method embodiments. FIG. 10 is a schematic diagram of a structure of a first communication apparatus 1000. The first communication apparatus includes a processing module 1001 and a transceiver module 1002.

Optionally, the first communication apparatus 1000 may further include a storage module (not shown in FIG. 10), configured to store program instructions and data.

Optionally, the transceiver module 1002 may also be referred to as a transceiver unit, and is configured to implement a sending function and/or a receiving function. The transceiver module 1002 may include a transceiver circuit, a transceiver machine, a transceiver, or a communication interface.

For example, the first communication apparatus 1000 may be the first communication apparatus, or may be a chip applied to the first communication apparatus, or another combined component or component that has a function of the first communication apparatus. When the first communication apparatus 1000 is the first communication apparatus, the transceiver module 1002 may be a transceiver that may include an antenna, a radio frequency circuit, and the like, and the processing module 1001 may be a processor (or a processing circuit), for example, a baseband processor that may include one or more CPUs. When the first communication apparatus is the component that has the function of the first communication apparatus, the transceiver module 1002 may be a radio frequency unit, and the processing module 1001 may be a processor (or a processing circuit), for example, a baseband processor. When the first communication apparatus 1000 is a chip system, the transceiver module 1002 may be an input/output interface of a chip, and the processing module 1001 may be a processor (or a processing circuit) of the chip system, and may include one or more central processing units.

For example, the transceiver module 1002 may include a receiving module and a sending module that are configured to respectively perform receiving and sending steps performed by the first communication apparatus in the foregoing method embodiments, and/or perform other processes for supporting the technology described in this application. The processing module 1001 may be configured to perform processing steps (for example, determining and obtaining) performed by the first communication apparatus in the foregoing method embodiments, and/or perform other processes for supporting the technology described in this application.

Specifically, the processing module 1001 is configured to generate a physical layer protocol data unit PPDU. The PPDU includes a short training field STF, a long training field LTF, and a data field. Cyclic shift is performed on at least one of the STF, the LTF, and the data field based on a cyclic shift diversity CSD. The CSD includes L elements, and L is a maximum number of spatial streams supported by the first communication apparatus. The maximum number of spatial streams is greater than 8. The transceiver module 1002 is configured to send the PPDU to a second communication apparatus.

Optionally, that the transceiver module 1002 is configured to send the PPDU to the second communication apparatus includes: The transceiver module 1002 is configured to send the PPDU to the second communication apparatus over K spatial streams. K is a positive integer less than or equal to L.

The transceiver module 1002 is specifically configured to send the PPDU to the second communication apparatus over K spatial streams, where K is a positive integer less than or equal to L.

Optionally, the STF, the LTF, and the data field are processed based on the first K elements in the CSD.

Optionally, L is equal to 16, and the CSD includes: 0, −400, −200, −600, −350, −650, −100, −750, −250, −475, −125, −450, −75, −175, −725, and −625.

Optionally, L is equal to 16, and the CSD includes: 0, −425, −200, −650, −475, −300, −625, −225, −150, −525, −50, −25, −375, −400, −550, and −325.

All related content of the steps in the foregoing method embodiments may be cited in function descriptions of the corresponding functional modules. Details are not described herein again.

In this embodiment, the first communication apparatus 1000 is presented in a form of functional modules obtained through division in an integrated manner. The module herein may be an ASIC, a circuit, a processor that executes one or more software or firmware programs, a memory, an integrated logic circuit, and/or another component capable of providing the foregoing functions. In a simple embodiment, a person skilled in the art may figure out that the first communication apparatus 1000 may be in a form of the communication apparatus 700 shown in FIG. 7.

For example, a processor 701 in the first communication apparatus 700 shown in FIG. 7 may invoke computer-executable instructions stored in a memory 703, so that the communication apparatus 700 performs the cyclic shift-based communication method in the foregoing method embodiments.

Specifically, functions/implementation processes of the processing module 1001 and the transceiver module 1002 in FIG. 10 may be implemented by the processor 701 in the communication apparatus 700 shown in FIG. 7 by invoking the computer-executable instructions stored in the memory 703. Alternatively, functions/implementation processes of the processing module 1001 in FIG. 10 may be implemented by the processor 701 in the communication apparatus 700 shown in FIG. 7 by invoking the computer-executable instructions stored in the memory 703, and functions/implementation processes of the transceiver module 1002 in FIG. 10 may be implemented through a communication interface 704 in the communication apparatus 700 shown in FIG. 7.

The first communication apparatus 1000 provided in this embodiment can perform the foregoing cyclic shift-based communication method. Therefore, for technical effect that can be achieved by the first communication apparatus 120, refer to the foregoing method embodiments. Details are not described herein again.

For example, the communication apparatus is the second communication apparatus in the foregoing method embodiments. FIG. 11 is a schematic diagram of a structure of a second communication apparatus 1100. The second communication apparatus 1100 includes a processing module 1101 and a transceiver module 1102.

Optionally, the second communication apparatus 1100 may further include a storage module (not shown in FIG. 11), configured to store program instructions and data.

Optionally, the transceiver module 1102 may also be referred to as a transceiver unit, and is configured to implement a sending function and/or a receiving function. The transceiver module 1102 may include a transceiver circuit, a transceiver machine, a transceiver, or a communication interface.

For example, the second communication apparatus 1100 may be the second communication apparatus, or may be a chip applied to the second communication apparatus, or another combined component or component that has a function of the second communication apparatus. When the second communication apparatus 1100 is the second communication apparatus, the transceiver module 1102 may be a transceiver that may include an antenna, a radio frequency circuit, and the like, and the processing module 1101 may be a processor (or a processing circuit), for example, a baseband processor that may include one or more CPUs. When the second communication apparatus 1100 is the component that has the function of the second communication apparatus, the transceiver module 1102 may be a radio frequency unit, and the processing module 1101 may be a processor (or a processing circuit), for example, a baseband processor. When the second communication apparatus 1100 is a chip system, the transceiver module 1102 may be an input/output interface of a chip, and the processing module 1101 may be a processor (or a processing circuit) of the chip system, and may include one or more central processing units.

For example, the transceiver module 1102 may include a receiving module and a sending module that are configured to respectively perform receiving and sending steps performed by the second communication apparatus in the foregoing method embodiments, and/or perform other processes for supporting the technology described in this application. The processing module 1101 may be configured to perform processing steps (for example, determining and obtaining) performed by the second communication apparatus in the foregoing method embodiments, and/or perform other processes for supporting the technology described in this application.

Specifically, the transceiver module 1102 is configured to receive a physical layer protocol data unit PPDU from a first communication apparatus. The PPDU includes a short training field STF, a long training field LTF, and a data field. At least one of the STF, the LTF, and the data field is obtained after cyclic shift is performed based on a cyclic shift diversity CSD. The CSD includes L elements, and L is a maximum number of spatial streams supported by the first communication apparatus. The maximum number of spatial streams is greater than 8. The processing module 1101 is configured to perform processing based on the PPDU.

The transceiver module 1102 is specifically configured to receive the PPDU from the first communication apparatus.

Optionally, the STF, the LTF, and the data field are obtained through processing based on the first K elements in the CSD.

Optionally, L is equal to 16, and the CSD includes: 0, −400, −200, −600, −350, −650, −100, −750, −250, −475, −125, −450, −75, −175, −725, and −625.

Optionally, L is equal to 16, and the CSD includes: 0, −425, −200, −650, −475, −300, −625, −225, −150, −525, −50, −25, −375, −400, −550, and −325.

All related content of the steps in the foregoing method embodiments may be cited in function descriptions of the corresponding functional modules. Details are not described herein again.

In this embodiment, the second communication apparatus 1100 is presented in a form of functional modules obtained through division in an integrated manner. The module herein may be an ASIC, a circuit, a processor that executes one or more software or firmware programs, a memory, an integrated logic circuit, and/or another component capable of providing the foregoing functions. In a simple embodiment, a person skilled in the art may figure out that the second communication apparatus 1100 may be in a form of the communication apparatus 700 shown in FIG. 7.

For example, a processor 701 in the second communication apparatus 700 shown in FIG. 7 may invoke computer-executable instructions stored in a memory 703, so that the communication apparatus 700 performs the cyclic shift-based communication method in the foregoing method embodiments.

Specifically, functions/implementation processes of the processing module 1101 and the transceiver module 1102 in FIG. 11 may be implemented by the processor 701 in the communication apparatus 700 shown in FIG. 7 by invoking the computer-executable instructions stored in the memory 703. Alternatively, functions/implementation processes of the processing module 1101 in FIG. 11 may be implemented by the processor 701 in the communication apparatus 700 shown in FIG. 7 by invoking the computer-executable instructions stored in the memory 703, and functions/implementation processes of the transceiver module 1102 in FIG. 11 may be implemented through a communication interface 704 in the communication apparatus 700 shown in FIG. 7.

The second communication apparatus 1100 provided in this embodiment can perform the foregoing cyclic shift-based communication method. Therefore, for technical effect that can be achieved by the second communication apparatus 1100, refer to the foregoing method embodiments. Details are not described herein again.

Optionally, an embodiment of this application further provides a communication apparatus. The communication apparatus includes a processor, configured to implement the method according to any one of the foregoing method embodiments. In a possible design, the communication apparatus further includes a memory. The memory is configured to store necessary program instructions and necessary data. The processor may invoke program code stored in the memory, to indicate the communication apparatus to perform the method according to any one of the foregoing method embodiments. Certainly, the communication apparatus may not include a memory. In another possible design, the communication apparatus further includes an interface circuit. The interface circuit is a code/data read/write interface circuit, and the interface circuit is configured to receive computer-executable instructions (where the computer-executable instructions are stored in a memory, and may be directly read from the memory, or may be read via another component) and transmit the computer-executable instructions to the processor. In still another possible design, the communication apparatus further includes a communication interface, and the communication interface is configured to communicate with a module other than the communication apparatus. The communication apparatus may be a chip or a chip system. When the communication apparatus is a chip system, the communication apparatus may include a chip, or may include a chip and another discrete component. This is not specifically limited in embodiments of this application.

Optionally, an embodiment of this application further provides a communication apparatus (for example, the communication apparatus may be a chip or a chip system). The communication apparatus includes an interface circuit and a logic circuit. The interface circuit is configured to obtain input information and/or output information. The logic circuit is configured to perform the method according to any one of the foregoing method embodiments, perform processing based on input information, and/or generate the output information.

When the communication apparatus is configured to implement functions of the first communication apparatus in the foregoing method embodiments, the output information may be a PPDU generated by the first communication apparatus. When the communication apparatus is configured to implement functions of the second communication apparatus in the foregoing method embodiments, the input information may be the PPDU generated by the first communication apparatus.

The communication apparatus provided in this embodiment can perform the foregoing communication method. Therefore, for technical effect that can be achieved by the communication apparatus, refer to the foregoing method embodiments. Details are not described herein again.

The foregoing descriptions about implementations allow a person skilled in the art to understand that, for the purpose of convenient and brief description, division into the foregoing functional modules is used as an example for illustration. In an actual application, the foregoing functions may be allocated to different functional modules and implemented based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, the division into modules or units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, may be located in one place, or may be distributed on different places. Some or all of the units may be selected based on actual requirements to achieve the objective of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like. In embodiments of this application, the computer may include the apparatus described above.

Although this application is described with reference to embodiments, in a process of implementing this application that claims protection, a person skilled in the art may understand and implement another variation of the disclosed embodiments by viewing the accompanying drawings, disclosed content, and appended claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the spirit and scope of this application. Correspondingly, the specification and accompanying drawings are merely example description of this application defined by the appended claims, and are considered as any of or all modifications, variations, combinations or equivalents that cover the scope of this application. It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method, wherein the method comprises:

generating, by a first communication apparatus, a physical layer protocol data unit (PPDU), wherein the PPDU comprises a short training field (STF), a long training field (LTF), and a data field; cyclic shift is performed on at least one of the STF, the LTF, or the data field based on a cyclic shift diversity (CSD); the CSD comprises L elements, and L is a maximum number of spatial streams supported by the first communication apparatus; and the maximum number of spatial streams supported by the first communication apparatus is greater than 8, and values of the L elements of the CSD comprise: 0, −400, −200, −600, −350, −650, −100, −750, −250, −475, −125, −450, −75, −175, −725, and −625 in nanoseconds, or 0, −425, −200, −650, −475, −300, −625, −225, −150, −525, −50, −25, −375, −400, −550, and −325 in nanoseconds; and sending, by the first communication apparatus, the PPDU to a second communication apparatus.

2. The method according to claim 1, wherein the sending, by the first communication apparatus, the PPDU to a second communication apparatus comprises:

sending, by the first communication apparatus, the PPDU to the second communication apparatus over K spatial streams, wherein K is a positive integer less than or equal to L.

3. The method according to claim 2, wherein the STF, the LTF, and the data field are processed based on the first K elements in the CSD.

4. The method according to claim 1, wherein L is equal to 16.

5. The method according to claim 1, wherein the first communication apparatus is an access point.

6. The method according to claim 1, wherein the second communication apparatus is a non-access point station.

7. A first communication apparatus, wherein the first communication apparatus comprises at least one processor and at least one non-transitory storage medium coupled to the at least one processor and storing programming instructions for execution by the at least one processor to cause the first communication apparatus to perform operations comprising:

generating a physical layer protocol data unit (PPDU), and the PPDU comprises a short training field (STF), a long training field (LTF), and a data field; cyclic shift is performed on at least one of the STF, the LTF, or the data field based on a cyclic shift diversity (CSD); the CSD comprises L elements, and L is a maximum number of spatial streams supported by the first communication apparatus; and the maximum number of spatial streams supported by the first communication apparatus is greater than 8, and values of the L elements of the CSD comprise: 0, −400, −200, −600, −350, −650, −100, −750, −250, −475, −125, −450, −75, −175, −725, and −625 in nanoseconds, or 0, −425, −200, −650, −475, −300, −625, −225, −150, −525, −50, −25, −375, −400, −550, and −325 in nanoseconds; and sending the PPDU to a second communication apparatus.

8. The first communication apparatus according to claim 7, wherein the sending the PPDU to the second communication apparatus comprises:

sending the PPDU to the second communication apparatus over K spatial streams, wherein K is a positive integer less than or equal to L.

9. The first communication apparatus according to claim 8, wherein the STF, the LTF, and the data field are processed based on the first K elements in the CSD.

10. The first communication apparatus according to claim 7, wherein L is equal to 16.

11. The first communication apparatus according to claim 7, wherein the first communication apparatus is an access point.

12. The first communication apparatus according to claim 7, wherein the second communication apparatus is a non-access point station.

13. A non-transitory computer-readable storage medium storing programming instructions for execution by at least one processor of a first communication apparatus to cause the first communication apparatus to perform operations comprising:

generating a physical layer protocol data unit (PPDU), and the PPDU comprises a short training field (STF), a long training field (LTF), and a data field; cyclic shift is performed on at least one of the STF, the LTF, or the data field based on a cyclic shift diversity (CSD); the CSD comprises L elements, and L is a maximum number of spatial streams supported by the first communication apparatus; and the maximum number of spatial streams supported by the first communication apparatus is greater than 8, and values of the L elements of the CSD comprise: 0, −400, −200, −600, −350, −650, −100, −750, −250, −475, −125, −450, −75, −175, −725, and −625 in nanoseconds, or 0, −425, −200, −650, −475, −300, −625, −225, −150, −525, −50, −25, −375, −400, −550, and −325 in nanoseconds; and sending the PPDU to a second communication apparatus.

14. The non-transitory computer-readable storage medium according to claim 13, wherein the sending the PPDU to a second communication apparatus comprises:

sending the PPDU to the second communication apparatus over K spatial streams, wherein K is a positive integer less than or equal to L.

15. The non-transitory computer-readable storage medium according to claim 14, wherein the STF, the LTF, and the data field are processed based on the first K elements in the CSD.

16. The non-transitory computer-readable storage medium according to claim 13, wherein L is equal to 16.

17. The non-transitory computer-readable storage medium according to claim 13, wherein the first communication apparatus is an access point.

18. The non-transitory computer-readable storage medium according to claim 13, wherein the second communication apparatus is a non-access point station.

* * * * *